United States Patent
Cai et al.

(10) Patent No.: US 10,469,168 B2
(45) Date of Patent: Nov. 5, 2019

(54) DISAGGREGATED INTEGRATED SYNCHRONOUS OPTICAL NETWORK AND OPTICAL TRANSPORT NETWORK SWITCHING SYSTEM

(71) Applicant: FUJITSU LIMITED, Kawasaki-shi, Kanagawa (JP)

(72) Inventors: Biaodong Cai, San Ramon, CA (US); Richard Dunsmore, McKinney, TX (US)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 15/800,733

(22) Filed: Nov. 1, 2017

(65) Prior Publication Data
US 2019/0132049 A1   May 2, 2019

(51) Int. Cl.
H04J 14/00 (2006.01)
H04B 10/27 (2013.01)
H04B 10/40 (2013.01)
H04B 10/25 (2013.01)

(52) U.S. Cl.
CPC ........... H04B 10/27 (2013.01); H04B 10/25 (2013.01); H04B 10/40 (2013.01)

(58) Field of Classification Search
CPC ........ H04B 10/27; H04B 10/25; H04B 10/40; H04J 3/1617; H04J 2203/0085; H04J 3/1611; H04J 3/1652; H04J 2203/0012; H04J 2203/0089; H04J 2203/0053; H04J 3/167; H04L 12/6402; H04L 45/745
USPC ........ 398/45–47, 51, 66, 67, 111, 52, 54, 57
See application file for complete search history.

(56) References Cited

U.S. PATENT DOCUMENTS

| | | | | |
|---|---|---|---|---|
| 7,602,703 | B2 * | 10/2009 | Moore | G06F 11/2005 370/217 |
| 8,238,365 | B2 * | 8/2012 | Zhao | H04J 3/167 370/466 |
| 9,344,208 | B2 * | 5/2016 | Belhadj | H04J 3/0667 |
| 9,942,633 | B2 * | 4/2018 | Cai | H04L 45/745 |

(Continued)

FOREIGN PATENT DOCUMENTS

| | | |
|---|---|---|
| EP | 2916496 | 9/2015 |
| EP | 2958279 | 12/2015 |
| EP | 3236601 | 10/2017 |

OTHER PUBLICATIONS

Fujitsu Limited, "Fujitsu Significantly Expands Its 1FINITY Series of Optical Transmission System Equipment." http://www.fujitsu.com/global/about/resources/news/press-releases/2016/0323-01.html; 5 pages, 2016.

(Continued)

Primary Examiner — Hibret A Woldekidan
(74) Attorney, Agent, or Firm — Baker Botts L.L.P.

(57) ABSTRACT

Methods and systems of a disaggregated integrated synchronous optical network (SONET) and optical transport network (OTN) switching system that includes using plug-in universal (PIU) modules for OTN to Ethernet transceiving, SONET PIU modules for Ethernet to SONET transceiving, and an Ethernet fabric as a switching core are disclosed. An OTN over Ethernet module in each of the PIU modules and an Ethernet over SONET module in each of the SONET PIU modules may enable various SONET and OTN functionality to be realized using the Ethernet fabric which may include multiple Ethernet switches.

18 Claims, 7 Drawing Sheets

(56) References Cited

U.S. PATENT DOCUMENTS

| | | | |
|---|---|---|---|
| 10,178,453 B2* | 1/2019 | Cai | H04L 45/745 |
| 10,219,050 B2* | 2/2019 | Cai | H04L 45/745 |
| 2005/0123294 A1 | 6/2005 | Mascolo et al. | |
| 2007/0264015 A1* | 11/2007 | Li | H04J 3/1611 |
| | | | 398/45 |
| 2008/0089693 A1 | 4/2008 | El-Ahmadi et al. | |
| 2009/0109843 A1 | 4/2009 | Yang | |
| 2009/0129772 A1* | 5/2009 | Trudel | H04J 3/085 |
| | | | 398/8 |
| 2009/0317073 A1 | 12/2009 | Hotchkiss et al. | |
| 2010/0040368 A1* | 2/2010 | Kotrla | H04L 12/4641 |
| | | | 398/54 |
| 2010/0221001 A1* | 9/2010 | Duan | H04J 3/0685 |
| | | | 398/45 |
| 2010/0265963 A1* | 10/2010 | Patenaude | H04J 3/1611 |
| | | | 370/404 |
| 2011/0255552 A1 | 10/2011 | Ellegard | |
| 2011/0280567 A1 | 11/2011 | Lyon et al. | |
| 2012/0033971 A1* | 2/2012 | Fourcand | H04Q 11/0478 |
| | | | 398/54 |
| 2012/0063312 A1 | 3/2012 | Sarwar et al. | |
| 2013/0136446 A1 | 5/2013 | Hotshkiss et al. | |
| 2013/0163982 A1 | 6/2013 | Tochio | |
| 2013/0343747 A1 | 12/2013 | Sarwar et al. | |
| 2014/0193146 A1 | 7/2014 | Lanzone et al. | |
| 2015/0023368 A1 | 1/2015 | Connolly et al. | |
| 2015/0222705 A1 | 8/2015 | Stephens | |
| 2016/0191425 A1 | 6/2016 | Schlansker et al. | |
| 2016/0226578 A1 | 8/2016 | Yuan et al. | |
| 2017/0019168 A1 | 1/2017 | Menard et al. | |
| 2017/0063672 A1 | 3/2017 | Chhabra et al. | |
| 2017/0105060 A1 | 4/2017 | Oltman et al. | |
| 2017/0118547 A1 | 4/2017 | West et al. | |
| 2017/0230294 A1 | 8/2017 | Saksena et al. | |
| 2017/0302560 A1 | 10/2017 | Luo et al. | |
| 2017/0310538 A1* | 10/2017 | Cai | H04L 45/745 |

OTHER PUBLICATIONS

Hardy, S. "Fujitsu offers CFP2-ACO coherent optical transceiver." http://www.lightwaveonline.com/articles/2015/03/fujitsu-offers-cfp2-aco-coherent-optical-transceiver.html; 2 pages, 2015.
Hollingsworth, T. "White-Box Switches: Are you Ready?" http://www.networkcomputing.com/networking/white-box-switches-are-you-ready/1465296666; 21 pages, 2014.
Knudsen-Baas, Per Harald. "OTN switching." Norwegian University of Science and Technology; 140 pages, 2011.
Lipscomb, F. "What Is a CFP2-ACO?" https://www.neophotonics.com/what-is-a-cfp2-aco/; 9 pages, 2016.
Rajesh K, "Data Center Network—Top of Rack (TOR) vs End of Row (EOR) Design." http://www.excitingip.com/2802/data-center-network-top-of-rack-tor-vs-end-of-row-eor-design/; 10 pages, 2016.
Wikipedia, "C Form-factor Pluggable." https://en.wikipedia.org/wiki/C_Form-factor_Pluggable; 3 pages, 2016.
Wikipedia, "QSFP." https://en.wikipedia.org/wiki/QSFP; 2 pages, 2016.
Wikipedia, "Small form-factor pluggable transceiver." https://en.wikipedia.org/wiki/Small_form-factor_pluggable_transceiver; 7 pages, 2016.
Wikipedia, "Optical Carrier Transmission Rates." https://en.wikipedia.org/wiki/Optical_Carrier_transmission_rates, 2017; 4 pages, 2017.
Wikipedia, "VT1.5." https://en.wikipedia.org/wiki/VT1.5, 2017; 1 pages, 2017.
Wikipedia, "Optical Transport Network." https://en.wikipedia.org/wiki/Optical_Transport_Network, 2016; 4 pages, 2016.
Wikipedia, "Synchronous Optical Networking." https://en.wikipedia.org/wiki/Synchronous_optical_networking, 2017; 17 pages, 2017.
International Telecommunication Union, "Interfaces for the Optical Transport Network" ITU-T G.709/Y.1331 (Jun. 2016); 244 pages, Jun. 2016.
International Telecommunication Union, "Architecture of Optical Transport Networks" ITU-T G.872 (Jan. 2017); 68 pages, Jan. 2017.
Wikipedia, "Digital Signal 1" https://en.wikipedia.org/wiki/Digital_Signal_1, 2017; 6 pages, 2017.
Extended European Search Report for European Patent Application No. 17167550.7, dated Sep. 20, 2017; 9 pages, Sep. 20, 2017.
Extended European Search Report for European Patent Application No. 17167552.3, dated Sep. 21, 2017; 5 pages, Sep. 21, 2017.
Office Action received from U.S. Appl. No. 15/419,569, dated Apr. 11, 2018; 7 pages, dated Apr. 11, 2018.
Office Action received from U.S. Appl. No. 15/419,649, dated Apr. 10, 2018; 10 pages, dated Apr. 10, 2018.
Office Action received from U.S. Appl. No. 15/419,751, dated Jun. 29, 2018; 17 pages, dated Jun. 29, 2018.
Office Action received from U.S. Appl. No. 15/419,751, dated Oct. 19, 2017; 24 pages, dated Oct. 19, 2017.
Office Action received from U.S. Appl. No. 15/811,159, dated Dec. 3, 2018; 5 pages, dated Dec. 3, 2018.

* cited by examiner

DISAGGREGATED INTEGRATED SYNCHRONOUS OPTICAL NETWORK AND OPTICAL TRANSPORT NETWORK SWITCHING SYSTEM

BACKGROUND

Field of the Disclosure

The present disclosure relates generally to optical communication networks and, more particularly, to a disaggregated integrated synchronous optical network and optical transport network switching system.

Description of the Related Art

Telecommunication, cable television and data communication systems use optical transport networks (OTN) and synchronous optical networks (SONET)/synchronous digital hierarchy (SDH) networks to rapidly convey large amounts of information between remote points. In an OTN and a SONET/SDH network, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the OTN. SONET/SDH networks may also include various synchronous transport signal switches, digital cross connect systems (DCSs), virtual tributary switches, etc. configured to perform various operations within the SONET/SDH network.

In particular, OTNs and SONET/SDH networks may be configured to transmit information between these networks. Typically, an optical transport network (OTN) switch is used to centrally perform electrical switching of the sub-channels carried within an optical signal to different destinations. Furthermore, typically, a SONET/SDH switch is used to transport multiple digital bit streams over fiber using multiple standardized multiplexing protocols.

SUMMARY

In one aspect, a disclosed synchronous optical network (SONET) and optical transport network (OTN) switching system may include an Ethernet fabric and a first plug-in universal (PIU) module that may be connected to a first optical data unit (ODU) path of an optical transport network (OTN) and may be connected to the Ethernet fabric. The first PIU module may receive a first ODU from the OTN via the first ODU path. The first PIU module may also convert the first ODU to a first Ethernet packet. The first PIU module may further transmit the first Ethernet packet to the Ethernet fabric. The SONET and OTN switching system may also include a first SONET PIU module that may be connected to the Ethernet fabric and may be connected to a first synchronous transport signal (STS) path of a STS switch fabric. The first SONET PIU module may receive the first Ethernet packet via the Ethernet fabric from the first PIU module from the first ODU path. The first SONET PIU module may also convert the first Ethernet packet to a first SONET circuit. The first SONET PIU module may further transmit the first SONET circuit to the STS switch fabric via the first STS path.

In any of the disclosed embodiments of the SONET and OTN switching system, the SONET and OTN switching system may also include a second SONET PIU module that may be connected to the Ethernet fabric and may be connected to a second STS path of the STS switch fabric. The second SONET PIU module may receive a second SONET circuit from the STS switch fabric via the second STS path. The second SONET PIU module may also convert the second SONET circuit to a second Ethernet packet. The second SONET PIU module may further transmit the second Ethernet packet to the Ethernet fabric. SONET and OTN switching system may further include a second PIU module that may be connected to a second ODU path of the OTN and may be connected to the Ethernet fabric. The second PIU module may receive the second Ethernet packet via the Ethernet fabric from the second SONET PIU module. The second PIU module may also convert the second Ethernet packet to a second ODU. The second PIU module may further transmit the second ODU to the OTN via the second ODU path.

In any of the disclosed embodiments of the SONET and OTN switching system, the first SONET PIU module may further include a STS pointer adjustment module that may perform a pointer adjustment process on the first SONET circuit to align the first SONET circuit with a STS clock domain of the STS switch fabric.

In any of the disclosed embodiments of the SONET and OTN switching system, the second SONET PIU module may further include an OTN over Ethernet (OTNoE) module that may perform a byte justification process on the second Ethernet packet to align the second Ethernet packet with an OTN clock domain of the Ethernet fabric.

In any of the disclosed embodiments of the SONET and OTN switching system, the first SONET PIU module may further include an OTNoE module that may format the first Ethernet packet into first formatted cells, an ODU re-assembler that may convert the first formatted cells to an ODU frame, an ODU shim that may convert the ODU frame to a corresponding optical payload unit (OPU) frame, an ODU STS de-mapper that may de-map the OPU frame into a STS frame, and a STS de-framer that may convert the STS frame to the first SONET circuit.

In any of the disclosed embodiments of the SONET and OTN switching system, the second SONET PIU module may further include a STS framer that may multiplex the second SONET circuit into a second STS frame, an ODU STS mapper that may map the second STS frame into a second OPU frame, an ODU shim that may map the second OPU frame into a second ODU frame, an ODU cellizer that may segment the ODU frame into corresponding second formatted cells, and an OTNoE module that may convert the second formatted cells to the second Ethernet packet.

In any of the disclosed embodiments of the SONET and OTN switching system, a SONET PIU module may use a SONET transport protocol for transmission of a SONET circuit over the STS switch fabric. The SONET circuit may have a SONET frame format of at least one of a synchronous transport signal 1 (STS-1) frame format, a STS-3 frame format, a STS-3c frame format, a STS-12 frame format, a STS-12c frame format, a STS-24 frame format, a STS-48 frame format, a STS-48c frame format, a STS-192 frame format, a STS-192c frame format, and a STS-768 frame format.

In any of the disclosed embodiments of the SONET and OTN switching system, a SONET PIU module may use a synchronous digital hierarchy (SDH) transport protocol for transmission of a SONET circuit over the STS switch fabric. The SONET circuit may have a SDH frame format of at least one of a synchronous transport module level 0 (STM-0) frame format, a STM-1 frame format, a STM-4 frame format, a STM-16 frame format, a STM-64 frame format, and a STM-256 frame format.

In any of the disclosed embodiments of the SONET and OTN switching system, an ODU may be at least one of an optical data unit 0 (ODU0), an ODU1, an ODU2, an ODU3, an ODU3, and an optical data unit flexible (ODUflex), and the STS may have a transmission data rate of up to at least one of a optical carrier (OC) transmission rate OC-3, OC-12, OC-48, and OC-192.

In any of the disclosed embodiments of the SONET and OTN switching system, the Ethernet fabric further may include a number N of Ethernet switches that may provide 1:N Ethernet switch fabric protection. A SONET PIU module may further include a protection STS path that may provide 1+1 STS switch fabric redundancy of the STS switch fabric.

In another aspect, a disclosed method may include receiving at a first plug-in universal (PIU) module of a synchronous optical network (SONET) and optical transport network (OTN) switching system a first optical data unit (ODU) from an OTN via a first ODU path of the OTN. The method may also include converting the first ODU to a first Ethernet packet. The method may further include transmitting the first Ethernet packet from the first PIU module to an Ethernet fabric of the SONET and OTN switching system. The method may also include receiving at a first SONET PIU module of the SONET and OTN switching system the first Ethernet packet via the Ethernet fabric from the first PIU module from the first ODU path. The method may further include converting the first Ethernet packet to a first SONET circuit. The method may also include transmitting the first SONET circuit from the first SONET PIU module to a synchronous transport signal (STS) switch fabric via a first STS path of the STS switch fabric.

In any of the disclosed embodiments of the method, the method may also include receiving at a second SONET module of the SONET and OTN switching system a second SONET circuit from the STS switch fabric via a second STS path of the STS switch fabric, converting the second SONET circuit to a second Ethernet packet, and transmitting the second Ethernet packet from the second SONET module to the Ethernet fabric. The method may further include receiving at a second PIU module of the SONET and OTN switching system the second Ethernet packet via the Ethernet fabric from the second SONET PIU module, converting the second Ethernet packet to a second ODU, and transmitting the second ODU from second PIU module to the OTN via the second ODU path.

In any of the disclosed embodiments of the method, converting the first Ethernet packet to the first SONET circuit may further include performing a pointer adjustment process on the first SONET circuit that may align the first SONET circuit with a STS clock domain of the STS switch fabric.

In any of the disclosed embodiments of the method, converting the second SONET circuit to the second Ethernet packet may further include performing a byte justification process on the second Ethernet packet that may align the second Ethernet packet with an OTN clock domain of the Ethernet fabric.

In any of the disclosed embodiments of the method, converting the first Ethernet packet to the first SONET circuit may further include formatting the first Ethernet packet into first formatted cells, converting the first formatted cells to an ODU frame, converting the ODU frame to a corresponding optical payload unit (OPU) frame, de-mapping the OPU frame into a STS frame, and converting the STS frame to the first SONET circuit.

In any of the disclosed embodiments of the method, converting the second SONET circuit to the second Ethernet packet may further include multiplexing the second SONET circuit into a second STS frame, mapping the second STS frame into a second OPU frame, mapping the second OPU frame into a second ODU frame, segmenting the ODU frame into corresponding second formatted cells, and converting the second formatted cells to the second Ethernet packet.

In any of the disclosed embodiments of the method, a SONET PIU module may use a SONET transport protocol for transmission of a SONET circuit over the STS switch fabric. The SONET circuit may have a SONET frame format of at least one of a synchronous transport signal 1 (STS-1) frame format, a STS-3 frame format, a STS-3c frame format, a STS-12 frame format, a STS-12c frame format, a STS-24 frame format, a STS-48 frame format, a STS-48c frame format, a STS-192 frame format, a STS-192c frame format, and a STS-768 frame format.

In any of the disclosed embodiments of the method, a SONET PIU module may use a synchronous digital hierarchy (SDH) transport protocol for transmission of a SONET circuit over the STS switch fabric. The SONET circuit may have a SDH frame format of at least one of a synchronous transport module level 0 (STM-0) frame format, a STM-1 frame format, a STM-4 frame format, a STM-16 frame format, a STM-64 frame format, and a STM-256 frame format.

In any of the disclosed embodiments of the method, an ODU may be at least one of an optical data unit 0 (ODU0), an ODU1, an ODU2, an ODU3, an ODU3, and an optical data unit flexible (ODUflex), and the STS may have a transmission data rate of up to at least one of a optical carrier (OC) transmission rate OC-3, OC-12, OC-48, and OC-192.

In any of the disclosed embodiments of the method, the Ethernet fabric further may include a number N of Ethernet switches that may provide 1:N Ethernet switch fabric protection. A SONET PIU module may further include a protection STS path that may provide 1+1 STS switch fabric redundancy of the STS switch fabric.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
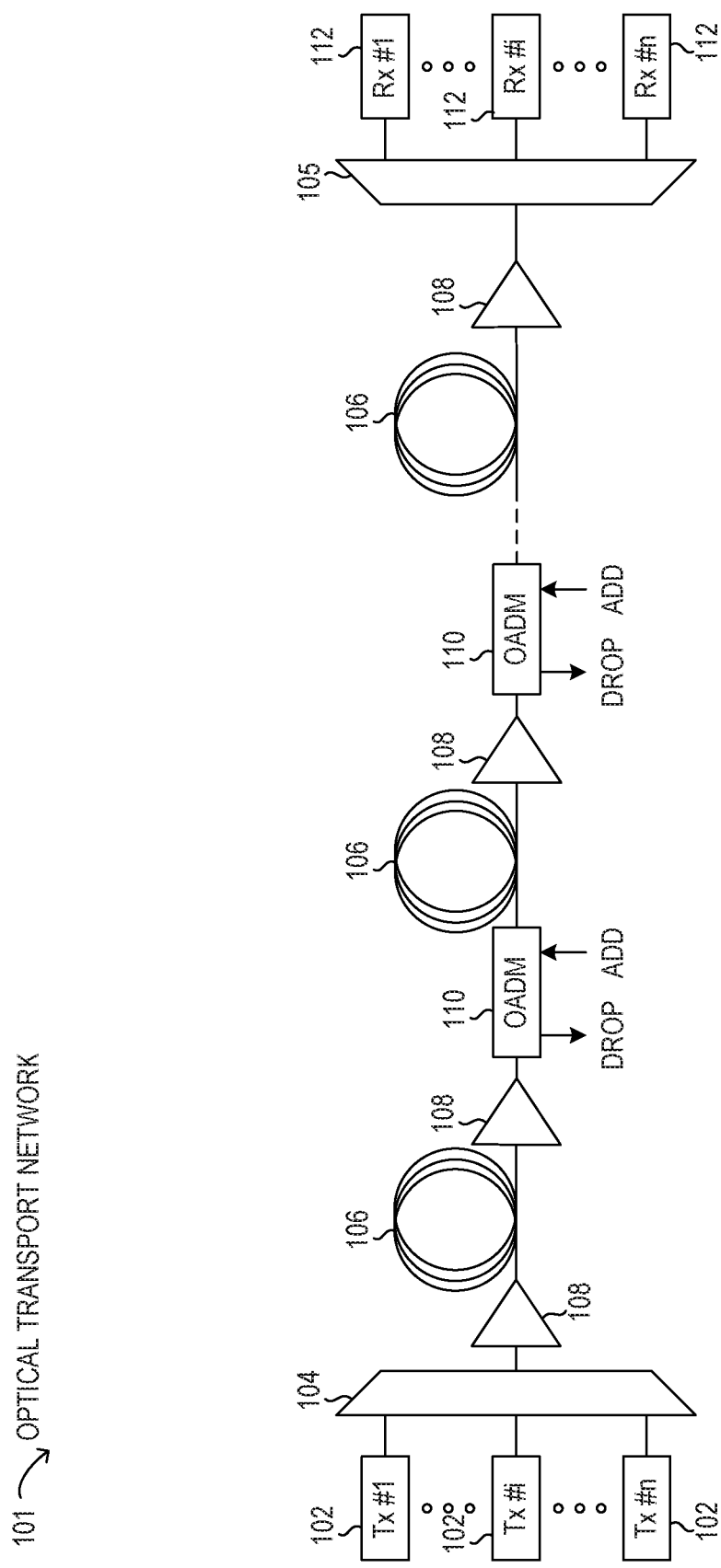
FIG. 1 is a block diagram of selected elements of an embodiment of an optical transport network (OTN)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. Examples of the data rates and applications of an ODUk in an OTN as defined in ITU-T Recommendation G.709 are given in Table 1 below.

TABLE 1

Data rates and applications of ODUk signals in an OTN.

| Signal | Data rate (Gbits/s) | Applications may include |
|---|---|---|
| ODU0 | 1.244 | Transport of a timing transparent transcoded (compressed) 1000BASE-X signal or a stream of packets (such as Ethernet, multiprotocol label switching (MPLS) or internet protocol (IP)) |
| ODU1 | 2.499 | Transport of two ODU0 signals or a synchronous transport signal 48 (STS-48)/synchronous transport module 16 (STM-16) signal or a stream of packets (such as Ethernet, MPLS or IP) |
| ODU2 | 10.037 | Transport of up to eight ODU0 signals or up to four ODU1 signals or a STS192/STM64 signal or a wide area network physical layer (WAN PHY) 10GBASE-W or a stream of packets (such as Ethernet, MPLS or IP) |
| ODU2e | 10.399 | Transport of a 10 Gigabit Ethernet signal or a timing transparent transcoded (compressed) Fibre Channel 10GFC signal |

TABLE 1-continued

Data rates and applications of ODUk signals in an OTN.

| Signal | Data rate (Gbits/s) | Applications may include |
|---|---|---|
| ODU3 | 40.319 | Transport of up to 32 ODU0 signals or up to 16 ODU1 signals or up to four ODU2 signals or a STS-768/STM-256 signal or a timing transparent transcoded 40 Gigabit Ethernet signal or a stream of packets (such as Ethernet, MPLS or IP) |
| ODU4 | 104.794 | Transport of up to 80 ODU0 signals or up to 40 ODU1 signals or up to ten ODU2 signals or up to two ODU3 signals or a 100 Gigabit Ethernet signal |
| ODUFlex | Client or configured bit rate | Transport of a constant bitrate signals such as Fibre Channel 8GFC, InfiniBand or Common Public Radio Interface or a stream of packets (such as Ethernet, MPLS or IP) |

In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

Figure 2:
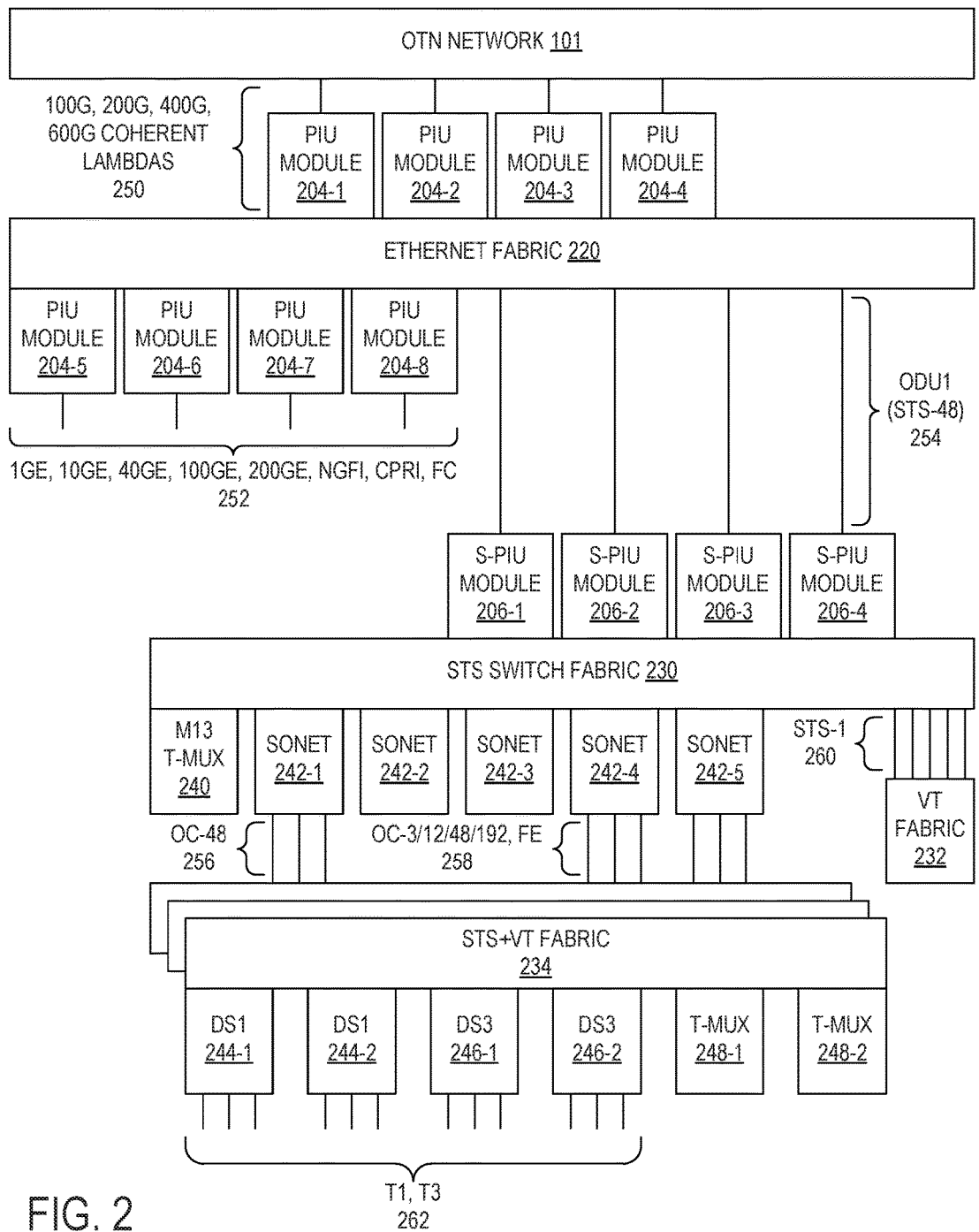
FIG. 2 is a block diagram of selected elements of an embodiment of a disaggregated integrated synchronous optical network (SONET) and OTN switching system.

Referring now to FIG. 2, a block diagram of selected elements of a disaggregated integrated SONET and OTN switching system 200 is illustrated. The disaggregated integrated SONET and OTN switching system 200 in FIG. 2 may be implemented for external switching of SONET circuits encapsulated in optical data unit (ODU) streams associated with a synchronous transport signal (STS) fabric and ODU streams associated with optical transport network 101 (see FIG. 1), respectively. FIG. 2 is a schematic diagram for descriptive purposes and is not drawn to scale or perspective.

Disaggregated integrated SONET and OTN switching system 200 may include OTN network 101, PIU modules 204 including PIU modules 204-1, 204-2, 204-3, 204-4, 204-5, 204-6, 204-7, and 204-8 coupled between OTN network 101 and an Ethernet fabric 220, S-PIU modules 206 including S-PIU modules 206-1, 206-2, 206-3, and 206-4 coupled between Ethernet fabric 220 and STS switch fabric 230. Disaggregated integrated SONET and OTN switching system 200 may also include a virtual tributary (VT) fabric 232, one or more STS and VT fabrics 234, a M13 transport multiplexer (T-MUX) line card 240, SONET line cards 242-1 through 242-5, digital signal 1 (DS1s) line cards 244-1 and 244-2, digital signal 3 (DS3s) line cards 246-1 and 246-2, and Transcode-Multiplexer (T-MUX) line cards 248-1 and 248-2.

SONET is a set of transport containers that allow for delivery of a variety of protocols, including traditional telephony, asynchronous transfer mode (ATM), Ethernet, and transmission control protocol/Internet protocol (TCP/IP) traffic. The SONET communications protocol is a multiplexed structure, with a header interleaved between data. This permits the encapsulated data to have its own frame rate and be able to "float around" relative to a SONET/SDH frame structure and rate. This interleaving permits a very low latency for the encapsulated data. Data passing through disaggregated integrated SONET and OTN switching system 200 may be delayed by at most 32 μs, compared to a frame rate of 125 μs. The basic unit of transmission in SONET is a synchronous transport signal 1 (STS-1) carried within an optical carrier signal, operating at an OC transmission rate. OC transmission rates are a standardized set of specifications of transmission bandwidth for digital signals that can be carried on SONET fiber optic networks. Transmission rates are defined by rate of the bit stream of the digital signal and are designated by hyphenation of the acronym OC and an integer value of the multiple of the basic unit of rate, e.g., OC-48. The base unit is 51.84 Mbit/s. Thus, the speed of optical-carrier-classified lines labeled as OCn is n×51.84 Mbit/s. The basic unit of framing in SDH of SONET/SDH system 202 is a synchronous transport module level 1 (STM-1), which operates at 155.520 Mbit/s.

Examples of SONET/SDH optical carrier levels and data rates are given in Table 2 below.

TABLE 2

SONET/SDH optical carrier levels and data rates.

| SONET Optical Carrier level | SONET frame format | SDH level & frame format | Payload bandwidth | Line rate |
|---|---|---|---|---|
| N/A | STS-1 | STM-0 | 50,112 kbits/s | 51,840 kbits/s |
| OC-3 | STS-3 | STM-1 | 150,336 kbits/s | 155,520 kbits/s |
| OC-3c | STS-3c | STM-1 | 150,336 kbits/s | 155,520 kbits/s |
| OC-12 | STS-12 | STM-4 | 601,344 kbits/s | 622,080 kbits/s |
| OC-12c | STS-12c | STM-4 | 601,344 kbits/s | 622,080 kbits/s |
| OC-48 | STS-48 | STM-16 | 2,405,376 kbits/s | 2,488,320 kbits/s |
| OC-48c | STS-48c | STM-16 | 2,405,376 kbits/s | 2,488,320 kbits/s |
| OC-192 | STS-192 | STM-64 | 9,621,504 kbits/s | 9,953,280 kbits/s |
| OC-192c | STS-192c | STM-64 | 9,621,504 kbits/s | 9,953,280 kbits/s |
| OC-768 | STS-768 | STM-256 | 38,486,016 kbits/s | 39,813,120 kbits/s |

SONET bandwidth is defined in multiples of STS-1, which can transport up to 51.48 Mbits/s. STS-Nc is a synchronous transport signal N concatenated for transmission over OC-Nc by multiplexing n STS-1 frames, such as for example, STS-192c and OC-192c. SONET may use a virtual tributary (VT) having a smaller portion of bandwidth to transport signals. Examples of types of VTs, transport signal type, and bandwidths in SONET are given in Table 3 below.

TABLE 3

Types of VTs, transport signal types, and bandwidths.

| Type of VT | Transport signal types | Bandwidth |
|---|---|---|
| VT 1.5 | DS-1 | 1.544 Mbit/s |
| VT 2 | E-1 | 2.048 Mbit/s |

As shown in Table 3, PCM T-carrier hierarchy defines four standardized VTs that may have bandwidths from 1.544 Mbits/s to 6.312 Mbits/s.

SONET synchronous payload envelopes (SPE) and SDH virtual containers (VC). Examples of SONET SPEs and SDH VCs are given in Table 4 below.

TABLE 4

SONET SPEs and SDH VCs.

| SONET SPEs | SDH VCs |
|---|---|
| STS-3c-SPE | VC-4 |
| STS-12c-SPE | VC-4-4c |
| STS-48c-SPE | VC-4-16c |
| STS-192c-SPE | VC-4-64c |

SONET supports a variety of payloads and multiplexes these payloads into SONET SPEs. Each of the SONET SPEs are called a specific SDH VCs as given in table 4.

T1 refers to the primary digital telephone carrier system used in North America. T1 is one line type of the PCM T-carrier hierarchy. T1 describes the cabling, signal type, and signal regeneration requirements of the carrier system. Examples of PCM T-carrier hierarchy governed by Fiber Optics Standard Dictionary; T1 Overview (Motorola, 1996) are given in Table 5 below.

TABLE 5

PCM T-carrier hierarchy.

| Digital Signal Designation | Line rate | Channels (DS0s) | Line |
|---|---|---|---|
| DS0 | 64 kbit/s | 1 | |
| DS1 | 1.544 Mbit/s | 24 | T1 |
| DS3 | 44.736 Mbit/s | 672 | T3 |

As shown in Table 5, PCM T-carrier hierarchy defines five standardized digital signals that may be transmitted at line rates from 64 kbits/s to 400.352 Mbits/s.

The signal transmitted on a T1 line, referred to as the DS1 signal, consists of serial bits transmitted at the rate of 1.544 Mbps. The type of line code used is called Alternate Mark Inversion (AMI). Digital Signal Designation is the classification of digital bit rates in the digital multiplex hierarchy used in transport of telephone signals from one location to another. DS-1 is a communications protocol for multiplexing the bitstreams of up to 24 telephone calls, along with two special bits: a framing bit (for frame synchronization) and a maintenance-signaling bit, transmitted over a digital circuit called T1. T1's maximum data transmission rate is 1.544 megabits per second.

PIU modules 204-1 through 204-4 may be configured to transmit multiple streams of data between OTN network 101 and Ethernet fabric 220 at transmission rates of 100 Gbits/s, 200 Gbits/s, 400 Gbits/s, and 600 Gbits/s (coherent lambdas 250). PIU modules 204-5 through 204-8 may be configured to transmit multiple streams of data between Ethernet fabric 220 and OTN network 101 using 1G, 10G, 40G, 100G, and 200G Ethernet interfaces, next generation fronthaul interface (NGFI), common public radio interface (CPRI), fibre channel over Ethernet interfaces 252 at transmission rates of 1 Gbits/s, 10 Gbits/s, 40 Gbits/s, 100 Gbits/s, 200 Gbits/s, NGFI rates, CPRI rates, and 10 Gbits/s, respectively. S-PIU modules 206-1 through 206-4 may be configured to transmit multiple streams of data between Ethernet fabric 220 and STS switch fabric 230 using ODU1 with STS-48 254 inside at a transmission rate of 2.499 Gbits/s, described in further detail below.

STS switch fabric 230 may be coupled to VT fabric 232 and may transmit multiple STS-1s 260 each at 51,840 kbits/s between them. STS switch fabric 230 may also be coupled to one or more STS and VT fabrics 234 via SONET line cards 242-1 through 242-5 and M13 T-MUX line card 240. STS switch fabric 230 may transmit multiple OCs including multiple OC-48 256 each at 2.488 Gbits/s, OC-3/12/48/192 and FE 258 each at 155.520 to 9,953 Mbits/s between them. STS and VT fabrics 234 are also coupled to T1 and T3 lines 262 via DS1 line cards 244-1 and 244-2, DS3 line cards 246-1 and 246-2, and T-MUX line cards 248-1 and 248-2. STS and VT fabrics 234 may transmit data each at 1.544 Mbit/s to 44.736 Mbit/s between them.

In contrast to the centralized and embedded nature of an OTN switch coupled to a STS switch fabric, which are unitary devices at a single central location, a disaggregated integrated SONET and OTN switching system is disclosed herein. The disaggregated integrated SONET and OTN switching system disclosed herein may enable disaggregation of the core switching functionality with the network interface functionality. The disaggregated integrated SONET and OTN switching system disclosed herein may enable SONET and OTN switching by relying on an internal Ethernet switching core (also referred to herein as an "Ethernet fabric"). The disaggregated integrated SONET and OTN switching system disclosed herein may provide a unified hierarchy of SONET and OTN switching. The disaggregated integrated SONET and OTN switching system disclosed herein may provide homogenous switching of ODU and STS frames (also referred to herein as SONET circuits and STS circuits) by using the Ethernet fabric. The disaggregated integrated SONET and OTN switching system disclosed herein may accordingly enable rapid customized configuration of a particular switching functionality at a particular location or at different remote locations. The disaggregated integrated SONET and OTN switching system disclosed herein may enable much lower cost SONET and OTN switching than by using an OTN switch coupled to a STS switch fabric. The disaggregated integrated SONET and OTN switching system disclosed herein may enable a much greater scalability as compared to the fixed switching capacity that is inherent in an OTN switch coupled to a STS switch fabric, because the Ethernet fabric employed may be external network infrastructure, such as data center switching systems, that can be expanded to a desired capacity. The disaggregated integrated SONET and OTN switching system disclosed herein may be implemented using a plurality of plug-in universal (PIU) modules and a plurality of SONET PIU modules that provide interfacing and transceiving functionality between various OTN signals, STS signals, and Ethernet signals. The disaggregated integrated SONET and OTN switching system disclosed herein may be further implemented using a PIU blade chassis that have interface slots populated by a number of PIU modules, which are interconnected, powered, and controlled using the PIU blade chassis and a SONET PIU blade chassis that have interface slots populated by a number of SONET PIU modules, which are interconnected, powered, and controlled using the SONET PIU blade chassis. Certain ones of PIU modules disclosed herein may enable localized direct OTN switching functionality by interconnecting two or more PIU modules in a loop-back configuration, without the use of a core Ethernet fabric. Certain ones of SONET PIU modules disclosed herein may enable localized direct STS switching functionality by interconnecting two or more SONET PIU modules in a loop-back configuration, without the use of a core Ethernet fabric.

Figure 3:
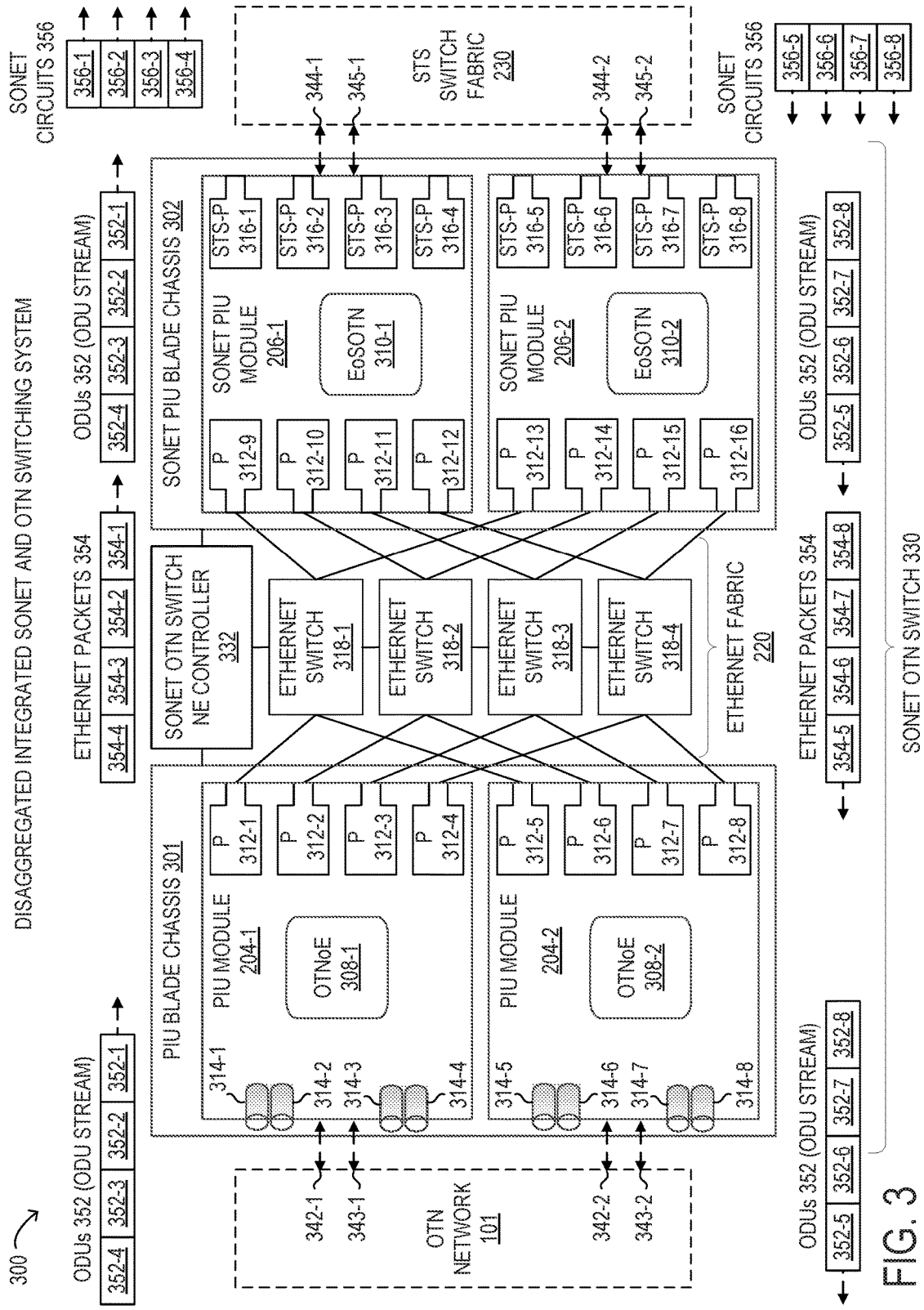
FIG. 3 is a block diagram of selected elements of an embodiment of a disaggregated integrated SONET and OTN switching system.

Referring now to FIG. 3, a block diagram of selected elements of an embodiment of a disaggregated integrated SONET and OTN switching system 300 is illustrated. Disaggregated integrated SONET and OTN switching system 300 in FIG. 3 may be implemented for external switching of optical signals associated with optical transport network 101 (see FIG. 1) and synchronous optical signals associated with STS switch fabric 230 (see FIG. 2) and is a schematic diagram for descriptive purposes and is not drawn to scale or perspective. External switching of optical signals refers to switching ODU paths of different bit rates, STS paths of different bit rates, and combinations of ODU paths and STS paths of different bit rates. An ODU and an STS frame are the atomic units of switching, where the different bit rates may be sub-wavelength bit rates, and the ODU and the STS frame remain in the optical domain outside of a SONET OTN switch 330 from network ingress to network egress. It is noted that within disaggregated integrated SONET and OTN switching system 300, an ODU and a STS frame may be accessed as an electrical domain object and SONET and OTN switching may include electrical switching technology.

As shown in FIG. 3, disaggregated integrated SONET and OTN switching system 300 may include a PIU blade chassis 301, a SONET PIU blade chassis 302, an Ethernet fabric 220, and a SONET OTN switch network element (NE) controller 332. PIU blade chassis 301 may include PIU modules 204-1 and 204-2. PIU blade chassis 301 may be a rack-mounted enclosure having an internal bus and an internal processor. PIU blade chassis 301 may receive PIU modules 204 via individual slots that connect PIU modules 204 to the internal bus. The internal bus may provide power and coordination among PIU modules 204. In certain embodiments, PIU blade chassis 301 includes a network connection for direct communication to SONET OTN switch NE controller 332. It is noted that PIU blade chassis 301 may be implemented with different numbers of slots and may be implemented in different form factors. It is noted that PIU modules 204 may have front side network connections for access while PIU modules 204 populate slots in PIU blade chassis 301. In some embodiments, PIU blade chassis 301 may include one or more PIU modules 204.

SONET PIU blade chassis 302 may include SONET PIU modules 206-1 and 206-2. Similar to PIU blade chassis 301, SONET PIU blade chassis 302 may be a rack-mounted enclosure having an internal bus and an internal processor. SONET PIU blade chassis 302 may receive SONET PIU modules 206 via individual slots that connect SONET PIU modules 206 to the internal bus. The internal bus may provide power and coordination among SONET PIU modules 206. In certain embodiments, SONET PIU blade chassis 302 includes a network connection for direct communication to SONET OTN switch NE controller 332. It is noted that SONET PIU blade chassis 302 may be implemented with different numbers of slots and may be implemented in different form factors. It is noted that SONET PIU modules 206 may have front side network connections for access while SONET PIU modules 206 populate slots in SONET PIU blade chassis 302. In some embodiments, SONET PIU blade chassis 302 may include one or more SONET PIU modules 206.

In FIG. 3, disaggregated integrated SONET and OTN switching system 300 is configured to function as SONET OTN switch 330, in which optical signals, in the form of ODUs 352 of an ODU stream connected to PIU modules 204 may be interconnected and logically switched among PIU modules 204 and SONET PIU modules 206. Optical signals, in the form of SONET circuits 356, connected to SONET PIU modules 206 may be interconnected and logically switched among PIU modules 204 and SONET PIU modules 206. At the core of disaggregated integrated SONET and OTN switching system 300 is an Ethernet fabric 220. Each of PIU modules 204 may function as a transceiver, with OTN inputs and outputs 314 (shown as cylindrical ports) being respectively converted from ODUs 352 to Ethernet packets 354 that are then switchable by one or more Ethernet switches 318. Each of SONET PIU modules 206 may function as a transceiver, with synchronous transport signal port (STS-P) inputs and outputs 316 being respectively converted from SONET circuits 356 to Ethernet packets 354 that are then switchable by one or more Ethernet switches 318.

Ethernet fabric 220 may employ Ethernet switches 318 in any kind of Ethernet switching architecture or Ethernet switching domain. In various embodiments, Ethernet fabric 220 may be implemented as a hierarchical spine-leaf architecture, which has become commonplace in many data center rack domains. Thus, each rack may have a so-called top-of-rack (TOR) leaf switch that operates at a relative low data throughput capacity, while the TOR leaf switches are then interconnected using a spine switch that operates at a relatively high data throughput capacity. In this manner, Ethernet fabric 220 may be hierarchically implemented using different numbers of TOR leaf switches and spine switches for any given network switching application, including aggregation into very large throughput Ethernet fabrics 220 that may have data throughput capacity of several dozens of terabytes, or even greater.

The interconnections between PIU modules 204 and Ethernet fabric 220, and SONET PIU modules 206 and Ethernet fabric 220, may be copper cabled connections, such as 1000BASE-CX, 1000BASE-KX, 1000BASE-T, and 1000BASE-TX for 1 GB Ethernet; such as 10GBASE-CX4, small form factor pluggable+(SFP+), 10GBASE-T, and 10GBASE-KX4 for 10 GB Ethernet; and such as 100GBASE-CR10, 100GBASE-CR4, 100GBASE-KR4, and 100GBASE-KP4 for 100 GB Ethernet, among other potential types of copper-cable based ports. In some embodiments, the interconnections between PIU modules 204 and Ethernet fabric 220, and SONET PIU modules 206 and Ethernet fabric 220, may be optical fiber Ethernet connections that are supported according to a variety of Ethernet standards for optical Ethernet ports. For example, for 100 GB Ethernet interconnections to Ethernet fabric, the interconnections may be any one or more of 100GBASE-SR10, 100GBASE-SR4, 100GBASE-LR4, 100GBASE-ER4, 100GBASE-CWDM4, 100GBASE-PSM4, 100GBASE-ZR, 100GBASE-KR4, and 100GBASE-KP4. For example, for up to 400 GB Ethernet interconnections to Ethernet fabric 220, the interconnections may be any one or more of 400GBASE-SR16, 400GBASE-DR4, 400GBASE-FR8, and 400GBASE-LR8. Furthermore, in certain embodiments, interconnections to Ethernet fabric 220 may utilize FlexEthernet (FlexE) in order to mix different transmission rates across Ethernet fabric 220.

Among the form factors for ports, PIU ports 312, used in PIU modules 204 are quad small form-factor pluggable (QFSP), C form-factor pluggable (CFP, CFP2), and SFP+. For example, on the OTN line side, CFP2 ports supporting analog coherent optics (ACO) may be used in PIU modules 204, such as for 100 gigabit (100G), 200 gigabit (200G), 400 gigabit (400G), 600 gigabit (600G) coherent OTN connections.

Among the form factors for SONET/SDH ports, STS ports 316, used in SONET PIU modules 206 are multiple small form-factor pluggable (SFP), 10 Gigabit small form factor pluggable (XFP), enhanced small form factor pluggable (SFP+). For example, on the SONET/SDH line side, XFP ports may be used in SONET PIU modules 206, such as for 10 Gigabit Ethernet, SONET at OC-192 rates, 10 Gigabit optical transport network, and 10 Gigabit/Fiber Channel.

Each PIU module 204 in disaggregated integrated SONET and OTN switching system 300 is further equipped with an OTN over Ethernet (OTNoE) module 308, respectively, which may be an application specific integrated circuit (ASIC), an ASSP (application specific standard product), or a field-programmable gate array (FPGA) that is customized for a particular purpose. Each SONET PIU module 206 in disaggregated integrated SONET and OTN switching system 300 is further equipped with an Ethernet over synchronous OTN (EoSOTN) module 310, which may also be an application specific integrated circuit (ASIC), an ASSP (application specific standard product), or a field-programmable gate array (FPGA) that is customized for a particular purpose. Each EoSOTN module 310 includes an OTNoE module 308 (See FIG. 4). EoSOTN module 310 is described in further detail below with reference to FIG. 4.

OTNoE module 308 in PIU module 204 and EoSOTN module 310 in SONET PIU module 206 may provide specific functionality to enable overall operation of disaggregated integrated SONET and OTN switching system 300 as SONET OTN switch 330. OTNoE module 308 and EoSOTN module 310 may be enabled to implement, in the context of disaggregated integrated SONET and OTN switching system 300, various types of synchronous OTN functionality over Ethernet fabric 220. OTNoE module 308 and EoSOTN module 310 may support or enable functionality for synchronous OTN path redundancy and path protection switching using Ethernet fabric 220. OTNoE module 308 and EoSOTN module 310 may support or enable functionality for concatenation of synchronous OTN path protection domains. OTNoE module 308 and EoSOTN module 310 may support or enable functionality for distribution of synchronous ODU paths and ODUs associated with the ODU paths and STS paths and STS frames associated with the STS paths over 1:N Ethernet fabric connections, where one Ethernet switch 318 is used to protect N other working Ethernet switches 318 in case any one of the N working Ethernet switches 318 has a failure or indicates performance of a maintenance operation that may result in an offline state. Furthermore, both 1:N and 0:N protection schemes may be supported. Given the nature of very high speed switching for OTN applications, SONET/SDH applications, and for Ethernet fabrics 220, as well as the cost and complexity of using external memory with OTNoE module 308 and EoSOTN module 310, a latency delay variation may be experienced among Ethernet switches 318. The latency delay variation (or jitter) by Ethernet fabric 220 may be an important factor to consider when choosing an ODU and STS frame path distribution scheme and a particular Ethernet fabric 220 when a protection scheme is used. OTNoE module 308 and EoSOTN module 310 may support or enable functionality for ensuring ODU path, STS path, and data integrity over Ethernet fabric 220, even when jitter occurs over Ethernet fabric 220. OTNoE module 308 and EoSOTN module 310 may support or enable functionality for switching higher level ODUs and STS frames over Ethernet fabric 220, even when the data throughput for the higher level ODUs and STS frames is larger than the underlying Ethernet ports in Ethernet fabric 220. OTNoE module 308 and EoSOTN module 310 may support or enable functionality for compressing synchronous OTN and SONET/SDH traffic to provide more efficient connections to Ethernet fabric 220, while compensating for jitter and bit error rate (BER) losses that may occur over Ethernet fabric 220, in order to enable using Ethernet fabric 220 for SONET OTN switching.

In FIG. 3, SONET OTN switch NE controller 332 (see also FIGS. 5 and 6) is shown that coordinates operation of PIU blade chassis 301, PIU modules 204, SONET PIU blade chassis 302, SONET PIU modules 206, and Ethernet fabric 220. SONET OTN switch NE controller 332 may be a software-defined networking (SDN) controller, a micro-controller unit (MCU), a virtual micro-controller unit (vMCU), or various types of controllers. Specifically, functionality in the SONET OTN switch NE controller 332 may be used to communicate with PIU blade chassis 301, PIU modules 204, SONET PIU blade chassis 302, SONET PIU modules 206, and Ethernet fabric 220 for SONET and OTN switching operations. SONET OTN switch NE controller 332 may accordingly configure switching paths and switching configurations, using software commands, to enable operation of disaggregated integrated SONET and OTN switching system 300 as an SONET OTN switch 330.

In operation, PIU modules 204-1 and 204-2 may be connected to OTN network 101 and Ethernet fabric 220. SONET PIU modules 206-1 and 206-2 may be connected to Ethernet fabric 220 and STS switch fabric 230. Disaggregated integrated SONET and OTN switching system 300 may establish ODU path 342-1 and STS path 344-2 to enable ODU forwarding of Ethernet packets 354 over Ethernet fabric 220 from PIU module 204-1 to SONET PIU module 206-2. ODU path 342-1 and STS path 344-2 may include connections from each of PIU ports 312 of PIU module 204-1 to each of Ethernet switches 318 including the connection from PIU port 312-1 to Ethernet switch 318-1, the connection from PIU port 312-2 to Ethernet switch 318-2, the connection from PIU port 312-3 to Ethernet switch 318-3, and the connection from PIU port 312-4 to Ethernet switch 318-4. ODU path 342-1 and STS path 344-2 may also include connections from each of Ethernet switches 318 to each of PIU ports 312 of SONET PIU module 206-2 including the connection from Ethernet switch 318-1 to PIU port 312-13, the connection from Ethernet switch 318-2 to PIU port 312-14, the connection from Ethernet switch 318-3 to PIU port 312-15, and the connection from Ethernet switch 318-4 to PIU port 312-16. It is noted that in different embodiments, disaggregated integrated SONET and OTN switching system 300 may establish multiple ODU paths 342 and STS paths 344 (not shown in FIG. 3), each ODU path 342 and STS path 344 to enable ODU forwarding over Ethernet fabric 220 from one PIU module 204 of multiple PIU modules 204 to one SONET PIU module 206 of multiple SONET PIU modules 206. In other embodiments, disaggregated integrated SONET and OTN switching system 300 may establish multiple ODU paths 342 (not shown in FIG. 3), each ODU path 342 to enable ODU forwarding over Ethernet fabric 220 from one PIU module 204 of multiple PIU modules 204 to another PIU module 204 of multiple PIU modules 204.

OTNoE 308-1 may receive ODUs 352-1, 352-2, 352-3 and 352-4 in sequence at PIU module 204-1 from OTN network 101. Each ODU 352 may include an ODU header having information that indicates a source PIU module 204 and a destination SONET PIU module 206. OTNoE 308-1 uses the information associated with each ODU 352 to determine the destination SONET PIU module 206. In the example embodiment, ODUs 352 each include information that indicates source PIU module 204 is PIU module 204-1 and destination SONET PIU module 206 is SONET PIU module 206-2. It is noted that in different embodiments, the ODU headers of associated ODUs 352 each may include information that indicates the associated source PIU module 204 is the same or different amongst ODUs 352 and the associated destination SONET PIU module 206 or destination PIU module 204 is the same or different amongst ODUs 352.

In disaggregated integrated SONET and OTN switching system 300, each PIU module 204 and each SONET PIU module 206 is assigned its own unique identifier. The unique identifier may be assigned by SONET OTN switch NE controller 332 during a configuration process of disaggregated integrated SONET and OTN switching system 300 or by SONET OTN switch NE controller 332 when each PIU module 204 and each SONET PIU module 206 is added to disaggregated integrated SONET and OTN switching system 300. PIU module identifier may be a media access control (MAC) address, a virtual local area network (VLAN) identifier, and the like.

OTNoE 308-1 determines from information included in each ODU header of associated ODUs 352 that the destination SONET PIU module 206 is SONET PIU module 206-2 and converts each ODU 352 including ODUs 352-1 through ODU 352-4 to each corresponding Ethernet packet 354 including Ethernet packets 354-1 through 354-4, respectively. In the example embodiment, there is a one to one correspondence between ODUs 352-1 through 352-4 and Ethernet packets 354-1 through 354-4. Each converted Ethernet packet 354 includes an Ethernet switching header which may include information from each ODU header of associated ODUs 352. The converted Ethernet packets 354 may be for transmission via ODU path 342-1 and STS path 344-2 corresponding to PIU module 204-1 and SONET PIU module 206-2. OTNoE 308-1 selects one of PIU ports 312 for transmission of each Ethernet packets 354 of Ethernet packets 354-1 through 354-4 and may transmit each Ethernet packet 354 of Ethernet packets 354-1 through 354-4 to SONET PIU module 206-2 from its selected port 312 of PIU module 204-1 over Ethernet switch 318 corresponding to the selected port 312.

SONET PIU module 206-2 may receive Ethernet packets 354-1 through 354-4 from Ethernet fabric 220 at PIU ports 312-13 through 312-16. SONET PIU module 206-2 may convert Ethernet packets 354-1 through 354-4 to corresponding ODUs 352-1 through 352-4. SONET PIU module 206-2 may then convert ODUs 352-1 through 352-4 to SONET circuits 356-1 through 356-4, which may or may not map one to one with ODUs 352-1 through 352-4. SONET PIU module 206-2 may further transmit SONET circuits 356-1 through 356-4 to STS switch fabric 230 via STS path 344-2 in the same sequence as they entered at PIU module 204-1.

Disaggregated integrated SONET and OTN switching system 300 may further establish STS path 344-1 and ODU path 342-2 to enable STS frame forwarding of SONET circuits 356 over Ethernet fabric 220 from SONET PIU module 206-1 to PIU module 204-2. Similar to ODU path 342-1 and STS path 344-2, STS path 344-1 and ODU path 342-2 may include connections from each PIU port 312 of PIU ports 312-9 through 312-12 to each Ethernet switch 318 of Ethernet switches 318-1 through 318-4. STS path 344-1 and ODU path 342-2 may also include connections from each Ethernet switch 318 of Ethernet switches 318-1 through 318-4 to each PIU port 312 of PIU ports 312-5 through 312-8. It is noted that in different embodiments, disaggregated integrated SONET and OTN switching system 300 may establish multiple STS path 344 and ODU paths 342 (not shown in FIG. 3), each STS path 344 and ODU path 342 to enable SONET circuit, STS frame, forwarding over Ethernet fabric 220 from one SONET PIU module 206 of multiple SONET PIU modules 206 to one PIU module 204 of multiple PIU modules 204. In other embodiments, disaggregated integrated SONET and OTN switching system 300 may establish multiple STS paths 344

(not shown in FIG. 3), each STS path 344 to enable SONET circuit, STS frame, forwarding over Ethernet fabric 220 from one SONET PIU module 206 of multiple SONET PIU modules 206 to another SONET PIU module 206 of multiple SONET PIU modules 206.

SONET PIU module 206-2 may receive SONET circuit 356-5, 356-6, 356-7 and 356-8 in sequence at SONET PIU module 206-2 from STS switch fabric 230. Each SONET circuit 356 may include a STS frame header having information that indicates a source SONET PIU module 206 and a destination PIU module 204. SONET PIU module 206-2 uses the information associated with each SONET circuit 356 to determine the destination PIU module 204. In the example embodiment, SONET circuits 356 each include information that indicates source SONET PIU module 206 is SONET PIU module 206-2 and destination PIU module 204 is PIU module 204-2. It is noted that in different embodiments, the STS frame headers of associated SONET circuits 356 each may include information that indicates the associated source SONET PIU module 206 is the same or different amongst SONET circuits 356 and the associated destination PIU module 204 or destination SONET PIU module 206 is the same or different amongst SONET circuits 356.

SONET PIU module 206-2 determines from information included in each STS frame header of associated SONET circuits 356 that the destination PIU module 204 is PIU module 204-2. SONET PIU module 206-2 may convert each SONET circuit 356 including SONET circuits 356-5 through SONET circuit 356-8 to ODUs 352 including ODUs 352-5 through 352-8. SONET PIU module 206-2 may convert each ODU 352 including ODUs 352-5 through 352-8 to each corresponding Ethernet packet 354 including Ethernet packets 354-5 through 354-8, respectively. In the example embodiment, there is a one to one correspondence between each SONET circuit 356-5 through SONET circuit 356-8 and each Ethernet packet 354-5 through 354-8, respectively. Each converted Ethernet packet 354 includes an Ethernet switching header which may include information from each STS frame header of associated SONET circuits 356. The converted Ethernet packets 354 may be for transmission via STS path 344-1 and ODU path 342-2 corresponding to SONET PIU module 206-2 and PIU module 204-2. SONET PIU module 206-2 selects one of PIU ports 312 for transmission of each Ethernet packets 354 of Ethernet packets 354-5 through 354-8 and may transmit each Ethernet packet 354 of Ethernet packets 354-5 through 354-8 to PIU module 204-2 from its selected port 312 of SONET PIU module 206-2 over Ethernet switch 318 corresponding to the selected port 312.

PIU module 204-2 may receive Ethernet packets 354-5 through 354-8 from Ethernet fabric 220 at PIU ports 312-5 through 312-8. PIU module 204-2 may convert Ethernet packets 354-5 through 354-8 to corresponding ODUs 356-5 through 356-8. PIU module 204-2 may further transmit ODUs 356-5 through 356-8 to OTN network 101 via ODU path 342-2 in the same sequence as they entered at SONET PIU module 206-2.

In FIG. 3, ODU paths 342-1 and 342-2 are working ODU paths 342 and STS paths 344-1 and 344-2 are working STS paths 344. Disaggregated integrated SONET and OTN switching system 300 may establish multiple working ODU paths 342 including working ODU paths 342-1 and 342-2 and multiple working STS paths 344 including working STS paths 344-1 and 344-2. Disaggregated integrated SONET and OTN switching system 300 may also establish multiple protection ODU paths 343 including protection ODU paths 343-1 and 343-2 for sub-network connection protection (SNCP), which is a per path protection mechanism for working ODU paths 342 including 342-1 and 342-2 using protection ODU paths 343 including protection ODU paths 343-1 and 343-2. Disaggregated integrated SONET and OTN switching system 300 may further establish multiple protection STS paths 345 including protection STS paths 345-1 and 345-2 SNCP, which is a per path protection mechanism for working STS paths 344 including 344-1 and 344-2 using protection STS paths 345 including STS paths 345-1 and 345-2. As shown, Ethernet fabric 220 includes 4 Ethernet switches 318 that may provide 1:4 Ethernet switch fabric protection. The 2 protection STS paths 345-1 and 345-2 in SONET PIU modules 206-1 and 206-2, respectively, may provide 1+1 fabric redundancy of STS switch fabric 230.

In FIG. 3, disaggregated integrated SONET and OTN switching system 300 is shown having 2 PIU modules 204, each having 4 PIU ports 312, 2 SONET PIU modules 206 each having 4 PIU ports 312 and 4 STS ports 316, and 4 Ethernet switches 318. It will be understood that a disaggregated integrated SONET and OTN switching system 300 may include up to a number N PIU modules 204, each having N PIU ports 312, up to N SONET PIU modules 206 each having N PIU ports 312 and N STS ports 316, and Ethernet fabric 220 that may include N Ethernet switches 318, where N is the total number of PIU modules 204 and SONET PIU modules 206 in any combination, such as N/2 PIU modules 204 and N/2 SONET PIU modules 206. Disaggregated integrated SONET and OTN switching system 300 may support or enable functionality for distribution of ODU paths 342 and ODUs 352 associated with ODU paths 342 and STS paths 344 and SONET circuits 356 associated with STS paths 344 over 1:N Ethernet fabric connections, where 1 Ethernet switch 318 is used to protect N other working Ethernet switches 318 in case any one of the N working Ethernet switches 318 has a failure or indicates performance of a maintenance operation that may result in an offline state. Furthermore, both 1:N and 0:N protection schemes may be supported including providing 1:N Ethernet switch fabric protection. In addition, protection STS paths 345 of each respective SONET PIU module 206 may provide 1+1 STS switch fabric redundancy of STS switch fabric 230.

In one or more embodiments, an ODU 352 may be at least one of an optical data unit 0 (ODU0), an ODU1, an ODU2, an ODU3, an ODU3, and an optical data unit flexible (ODUflex). The STS signal of an SONET circuit 356 may have a transmission data rate of up to at least one of a optical carrier (OC) transmission rate OC-3, OC-12, OC-48, and OC-192.

In one or more embodiments, a SONET PIU module 206 may use a SONET transport protocol for transmission of an SONET circuit 356 over STS switch fabric 230. The SONET circuit 356 may have a SONET frame format of at least one of a synchronous transport signal 1 (STS-1) frame format, a STS-3 frame format, a STS-12 frame format, a STS-24 frame format, a STS-48 frame format, a STS-192 frame format, and a STS-768 frame format. In one or more embodiments, a SONET PIU module 206 may use a synchronous digital hierarchy (SDH) transport protocol for transmission of an SONET circuit 356 over STS switch fabric 230. The SONET circuit 356 may have a SDH frame format of at least one of a synchronous transport module level 0 (STM-0) frame format, a STM-1 frame format, a STM-4 frame format, a STM-16 frame format, a STM-64 frame format, and a STM-256 frame format. may have VC-4, VC4-4c, VC4-16c, and VC4-64c.

Figure 4:
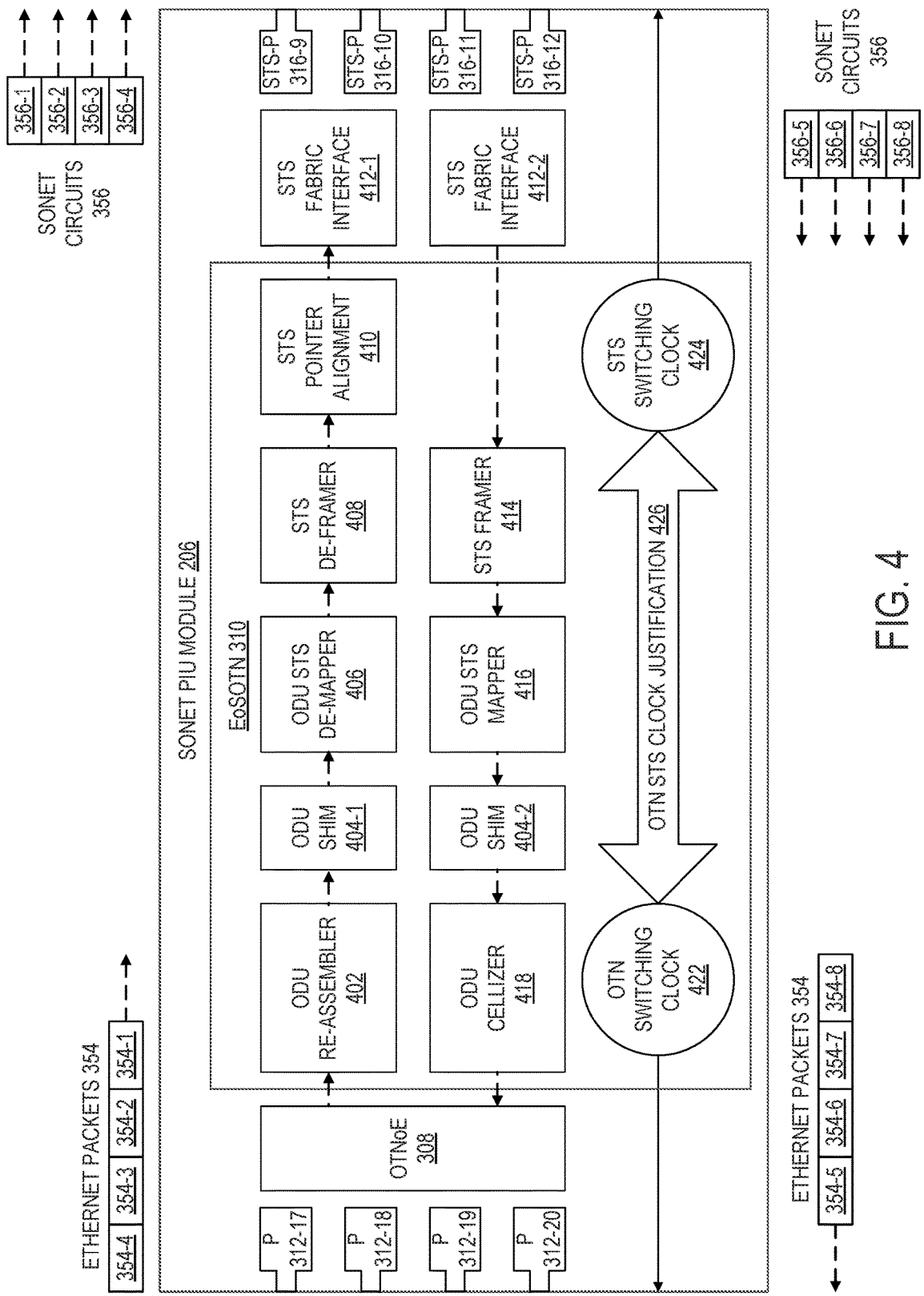
FIG. 4 is a block diagrams of selected elements of an embodiment of a SONET plug-in universal (PIU) module.

FIG. 4 illustrates further internal details of SONET PIU module 206. It is noted that FIG. 4 is not drawn to scale but is a schematic illustration. In various embodiments, SONET PIU module 206 may be implemented using fewer or additional components than illustrated in FIG. 4.

In FIG. 4, a SONET PIU module 206 may further include OTNoE 308, EoSOTN 310, STS-fabric interfaces 412-1 and 412-2, an OTN switching clock 422, and a STS switching clock 424. SONET PIU module 206 may also include PIU ports (P) 312-17, 312-18, 312-19, and 312-20 connected to Ethernet fabric 220 and STS ports (STS-P) 316-9, 316-10, 316-11, and 316-12 connected to STS switch fabric 230. EoSOTN 310 may include an ODU re-assembler 402, ODU shims 404-1 and 404-, an ODU STS de-mapper 406, a STS de-framer 408, a STS pointer alignment module 410, a STS framer 414, an ODU STS mapper 416, and an ODU cellizer.

SONET PIU module 206 may span two clock domains including an OTN clock domain of OTN switching clock 422 and a STS clock domain of STS switching clock 424. The OTN clock domain may be sourced from OTN switching clock 422 and the STS clock domain may be sourced from STS switching clock 424. In some embodiments, the OTN clock domain and the STS clock domain may be sourced from a single clock source, for example, OTN switching clock 422 or STS switching clock 424. However, separate clock domain treatment of the OTN clock domain and the STS clock domain may be necessary as the other end of an ODU path 342 and the other end of a STS path 344 is arbitrary and may be sourced from different clock sources.

During operation, when SONET PIU module 206 is to transmit Ethernet packets 354-1 through 354-4 from Ethernet fabric 220 to STS switch fabric 230, OTNoE 308 may receive Ethernet packets 354-1 through 354-4 from Ethernet fabric 220 at one of PIU ports 312, such as PIU port 312-17. In response to receiving Ethernet packets 354-1 through 354-4, OTNoE 308 may de-capsulate Ethernet packets 354-1 through 354-4 to remove the Ethernet headers, re-sequence the de-capsulated data, and format the re-sequenced and de-capsulated data into formatted cells. OTNoE 308 may provide the formatted cells to ODU re-assembler 402.

ODU re-assembler 402 may receive the formatted cells and convert the formatted cells to continuous octet streams of ODUn frames for STS circuits of STSm, as described above. For example, re-assembler may convert the formatted cells to continuous octet streams of ODU1 frames for STS circuits of STS-48. As another example, re-assembler may convert the formatted cells to continuous octet streams of ODU2 frames for STS circuits of STS 192c. ODU re-assembler 402 may provide the continuous octet streams of ODUn frames for STS circuits of STSm to ODU shim 404-1. In response, ODU shim 404-1 may extract a corresponding optical payload unit (OPU) frame, such as, for example, an OPU1 frame corresponding to an ODU1 frame or an OPU2 frame corresponding to an ODU2 frame, and provide the OPU frames to ODU STS de-mapper 406. ODU STS de-mapper 406 may de-map the OPU frames into STS frames, such as, STS 48 frames, and provide the STS frames to STS de-framer 408. STS de-framer 408 may perform STS level de-framing and de-muxing to convert the STS frames to one or more component SONET circuits 356-1 through 356-4, which may be STS-m circuits, for example, STS-48 circuits. STS pointer alignment module 410 may extract one or more STS paths 344 from SONET circuits 356-1 through 356-4. For example, STS pointer alignment module 410 may extract STS path 344-2. STS pointer alignment module 410 may perform a pointer adjustment process, for example, OTN STS clock justification 426, on SONET circuits 356-1 through 356-4 to align SONET circuits 356-1 through 356-4 with STS clock domain of STS switching clock 424 of STS switch fabric 230 including aligning the one or more STS paths with STS switching clock 424. SONET PIU module 206 may transmit each of the aligned SONET circuits 356-1 through 356-4 from one of STS ports 316, such as STS port 316-9, to STS switch fabric 230 via STS path 344-2 using STS fabric interface 412-1 to perform STS granularity switching, where the switching granularity may be STS-1, STS-3c, STS-12c, STS-48c, and STS-192c.

When SONET PIU module 206 is to transmit SONET circuits 356-5 through 356-8 from STS switch fabric 230 to Ethernet fabric 220, SONET PIU module 206 may receive SONET circuits 356-5 through 356-8 via STS switch fabric 230 from STS path 344-1 at one of STS ports 316, such as STS port 316-11 using STS fabric interface 412-2. The SONET circuits 356-5 through 356-8 received are already aligned to the STS clock domain of STS switching clock 424 of STS switch fabric 230. In response to receiving SONET circuits 356-5 through 356-8, SONET PIU module 206 may provide SONET circuits 356-5 through 356-8 to STS framer 414. STS framer 414 may multiplex all of component SONET circuits 356-5 through 356-8 into a higher order STS-n. For example, STS framer 414 may multiplex SONET circuits 356-5 through 356-8 into an STS-48 frame for STS-1, STS-3c, STS-12c, STS circuits and a STS-192 frame for STS-192c circuits. STS framer 414 may provide the STS-48 frame or the STS-192 frame to ODU STS mapper 416. ODU STS mapper 416 may map the STS-48 frame or the STS-192 frame into an OPU1 frame or an OPU2 frame, respectively, and provide the OPU1 frame or the OPU2 frame to ODU shim 404-2. ODU shim 404-2 may map the OPU1 frame or the OPU2 frame into a corresponding ODU1 frame or ODU2 frame, respectively, and provide the ODU1 frame or the ODU2 frame to ODU cellizer 418. ODU cellizer 418 may segment the ODU1 frame or the ODU2 frame into corresponding cells and provide the cells to OTNoE 308. OTNoE 308 may encapsulate the cells into Ethernet packets 354-5, 354-6, 356-7, and 356-8. OTNoE 308 may also perform a byte justification process, for example, OTN STS clock justification 426, on Ethernet packets 354-5 through 354-8 to align Ethernet packets 354-5 through 354-8 with OTN clock domain of OTN switching clock 422 of Ethernet fabric 220. SONET PIU module 206 may transmit Ethernet packets 354-5 through 354-8 from one or more of PIU ports 312-17 through PIU port 312-20, to Ethernet fabric 220 via ODU path 342-2.

SONET PIU module 206 has an ODU and a STS SONET OTN switch granularity for transmission between Ethernet fabric 220 and STS switch fabric 230, which may affect the number of degrees for next digital cross connect system (DCS) hop adjacency to other DCSs, the latency of the ODU cellization process, the efficiency of the ODU as a carrier for SONET/SDH, and design complexity. For a given SONET OTN switch capacity of SONET OTN switch 330 between the OTN switching domain and the SONET/SDH domain, using ODU1 will support four times (4×) more degrees for DCS hop adjacency than using ODU2. For example, if SONET OTN switch capacity is 80G, than using ODU2 may have 8 DCS hop adjacencies versus using ODU1 32 having 32 DCS hop adjacencies. If two SONET OTN switches 330 are used in parallel in a network element, the DCS hop adjacencies for using ODU2 and ODU1 will be 16 and 64, respectively. The latency of the ODU cellization process for ODU0 in a 240 Byte sample may require 1.536 μs for cellization TX. Using ODU1 may only require 768 ns. With respect to the efficiency of the ODU as a carrier for SONET/SDH, when STS-3 and STS-12 are mapped into ODU0, they have a mapping efficiency of 12.5% and 50%, respectively. In other words, if STS-3 is mapped into an ODU0, 7/8 of the ODU0 capacity is wasted. However, when STS-48 is mapped into ODU1 and STS-192 is mapped into ODU2, the mapping efficiency is 100%. With respect to the design complexity, for a given SONET OTN switch capacity of SONET OTN switch 330, the more ODU paths, the higher the number of clock adjustments and justification that are needed, and the shorter the time allowed for handling each ODU path, which increases the design complexity accordingly. Considering the affects described above, ODU1 and STS-48 may provide a basic STS SONET OTN switch granularity to minimize the impacts and maximize the benefits. Other combinations of ODUs and STSs may also be used as a basic STS SONET OTN switch granularity and may provide similar benefits.

Figure 5:
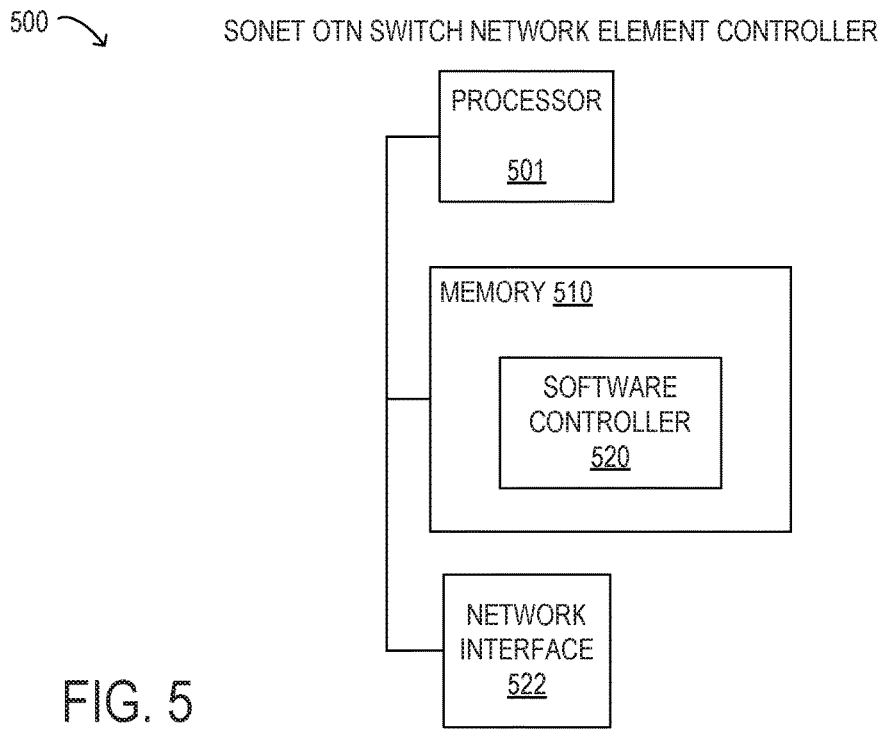
FIGS. 5 and 6 are block diagrams of selected elements of an embodiment of a SONET OTN switch network element controller.

Referring now to FIG. 5, a block diagram of selected elements of an embodiment of a SONET OTN switch network element (NE) controller 500 is illustrated. SONET OTN switch NE controller 500 in FIG. 5 may be implemented to control disaggregated integrated SONET and OTN switching system 300 (see FIG. 3) and is a schematic diagram for descriptive purposes.

In FIG. 5, SONET OTN switch network element controller 500 is represented as a computer system including physical and logical components for implementing disaggregated integrated SONET and OTN switching system 300, as described herein, and may accordingly include processor 501, memory 510, and network interface 522. Processor 501 may represent one or more individual processing units and may execute program instructions, interpret data, process data stored by memory 510 or SONET OTN switch Network Element Controller 500. It is noted that SONET OTN switch network element controller 500 may be implemented in different embodiments. For example, in some embodiments, SONET OTN switch network element controller 500 may be implemented using a network element. In particular embodiments, memory 510 may represent a software controller 520 executing on processor 501.

In FIG. 5, memory 510 may be communicatively coupled to processor 501 and may comprise a system, device, or apparatus suitable to retain program instructions or data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 510 may include different numbers of physical storage devices, in various embodiments. As shown in FIG. 5, memory 510 may include software controller 520, among other applications or programs available for execution.

Figure 6:
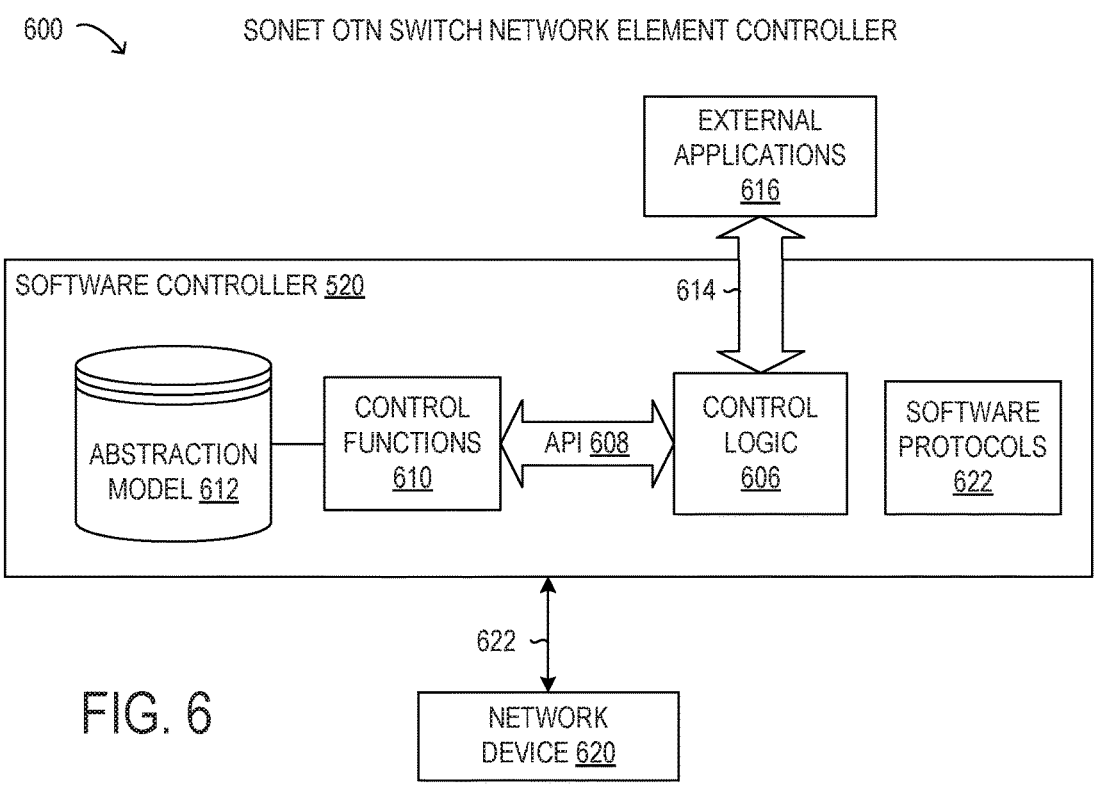

Referring now to FIG. 6, a block diagram of selected elements of an embodiment of a SONET OTN switch network element controller 600 is illustrated. FIG. 6 shows further details of software controller 520 for performing SDN operations related to disaggregated integrated SONET and OTN switching system 300, as described above.

In FIG. 6, software controller 520 is shown including a repository that may store any of various different abstraction models 612, selected as examples among other abstraction models for descriptive clarity. In some embodiments, abstractions models 612 are defined using YANG, which is a data modeling language for modeling configuration and state data used to manage network devices through a network configuration protocol (NETCONF). Specifically, abstraction model 612 may include a service abstraction model that may model configuration and state data for network services used with optical transport network 101 and STS switch fabric 230. Abstraction model 612 may include a network abstraction model that may model configuration and state data for network connections used with optical transport network 101 and STS switch fabric 230. Abstraction model 612 may include a device abstraction model that may model configuration and state data for network devices 620 used in optical transport network 101 and STS switch fabric 230. Control functions 610 may represent various control functions for network services, network connections, and network devices 620. API 608 may enable control logic 606 to access control functions 610 for network services, network connections, and network devices 620.

As shown in SONET OTN switch network element controller 600, API 608 may enable communication between control logic 606, as well as external applications 616. Some non-limiting examples of external applications 616 that may be used with software controller 520 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Franciso, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

In implementations of SONET OTN switch network element controller 600, control logic 606 may comprise internal control logic that remains proprietary, internal, or administratively protected within software controller 520. Non-limiting examples of internal or protected portions of control logic 606 may include complex proprietary algorithms, such as for path computation, and private business logic, such as billing algorithms of the network operator. In disaggregated integrated SONET and OTN switching system 300, control logic 606 may include functionality for communicating with PIU blade chassis 301, synchronous OTN PIU blade chassis 302, and Ethernet fabric 220, as described above.

Furthermore, software controller 520 may interact with various network devices 620 using different network protocols. For example, software controller 520 may interact with network device 620 using a software protocol 622 that is a NETCONF protocol, a command line interface (CLI), or a simple network management protocol (SNMP). Network devices 620 may represents routers, switches, or network elements that are included in optical transport network 101 and STS switch fabric 230. As noted above, network abstraction models 612 may be repositories, such as databases with representations of functions supported by software controller 520, while the actual implementation of the functions is performed by control functions 610. Accordingly, control functions 610 may utilize the different software protocols 622 to access network devices 620.

It is noted that network devices 620 and software protocols 622 are shown in a logical view in FIG. 6 not a physical view. The actual physical connections between network devices 620 and software controller 520 may be different in different embodiments, such as using one or more network connections.

Figure 7:
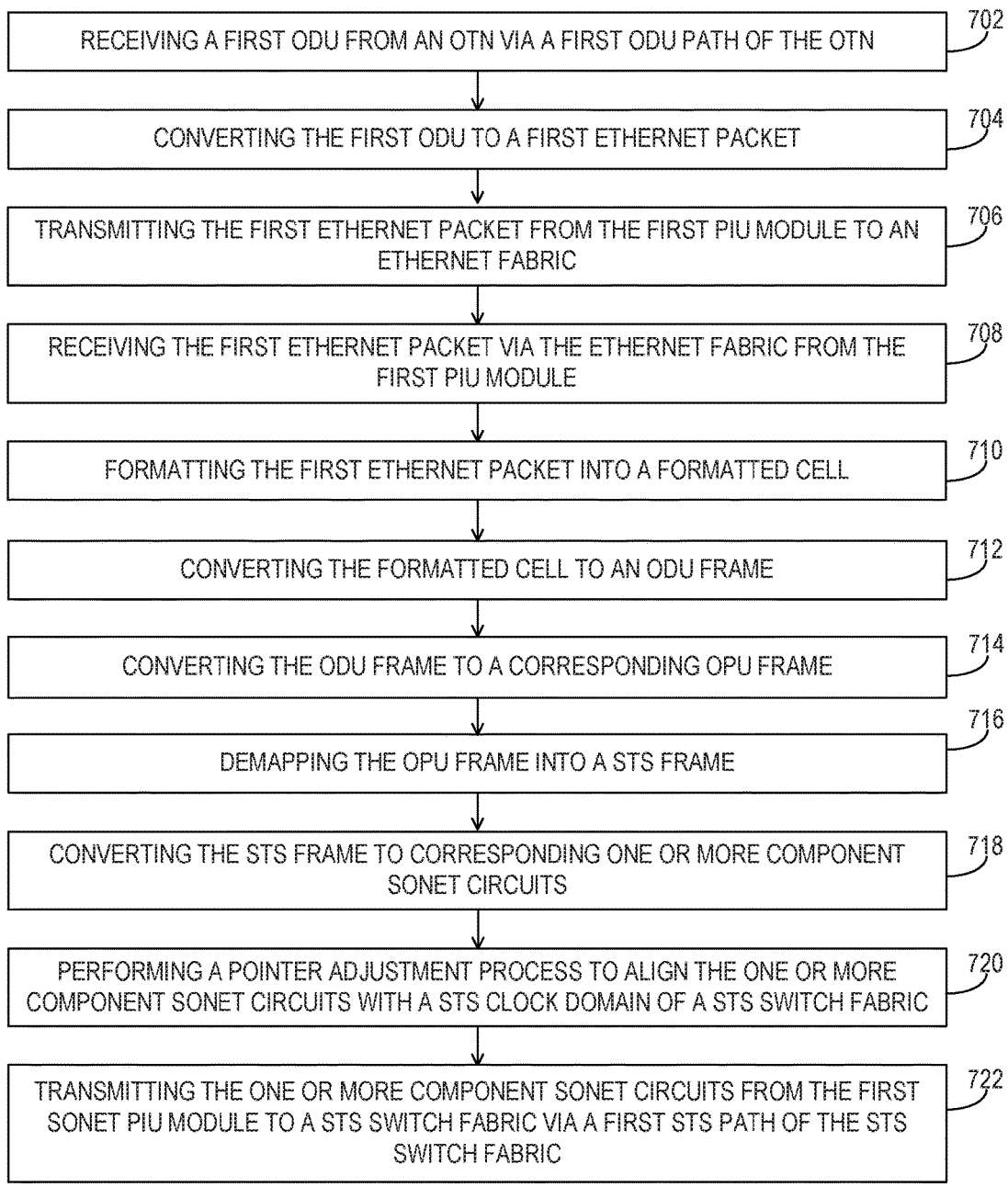
FIG. 7 is a flowchart of selected elements of an embodiment of a method for transmitting synchronous transport signals (STSs) in a disaggregated integrated SONET and OTN switching system.

Referring now to FIG. 7, a flowchart of selected elements of an embodiment of a method 700 for transmitting synchronous transport signals (STS) in a disaggregated integrated SONET and OTN switching system, as described herein, is depicted. In various embodiments, method 700 may be performed using disaggregated integrated SONET and OTN switching system 300 in an optical network and a synchronous transport signal fabric. It is noted that certain operations described in method 700 may be optional or may be rearranged in different embodiments.

Method 700 may begin at step 702 by receiving at a first PIU module of an integrated SONET and OTN switching system a first ODU from an OTN via a first ODU path of the OTN. At step 704, converting, by the first PIU module, the first ODU to a first Ethernet packet. At step 706, transmitting, by the first PIU module, the first Ethernet packet from the first PIU module to an Ethernet fabric of the integrated SONET and OTN switching system. At step 708, receiving at a first SONET PIU module of the integrated SONET and OTN switching system the first Ethernet packet via the Ethernet fabric from the first PIU module. At step 710, formatting, by the first SONET PIU module, the first Ethernet packet into a formatted cell. At step 712, converting, by an ODU re-assembler of the first SONET PIU module, the formatted cell to an ODU frame. At step 714, converting, by an ODU shim of the first SONET PIU module, the ODU frame to a corresponding OPU frame. At step 716, de-mapping, by an ODU STS de-mapper of the first SONET PIU module, the OPU frame into a STS frame. At step 718, converting, by a STS de-framer of the first SONET PIU module, the STS frame to corresponding one or more component SONET circuits. At step 720, performing, by a STS pointer alignment module of the first SONET PIU module, a pointer adjustment process to align the one or more component SONET circuits with a STS clock domain of a STS switch fabric. At step 722, transmitting the one or more component SONET circuits from the first SONET PIU module to a STS switch fabric via a first STS path of the STS switch fabric.

Figure 8:
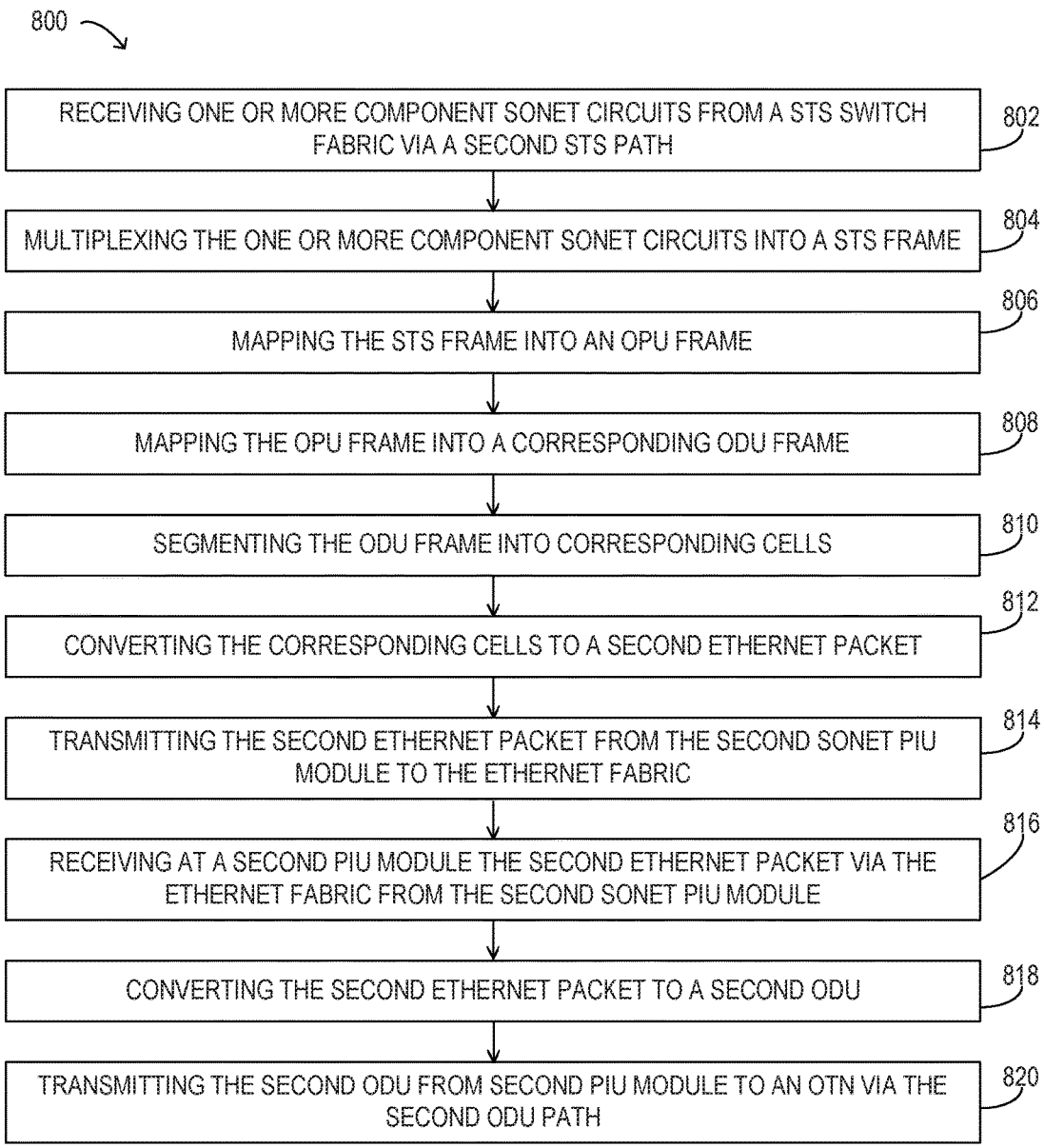
FIG. 8 is a flowchart of selected elements of an embodiment of a method for receiving STSs in a disaggregated integrated SONET and OTN switching system.

Referring now to FIG. 8, a flowchart of selected elements of an embodiment of a method 800 for receiving synchronous transport signals (STS) in a disaggregated integrated SONET and OTN switching system, as described herein, is depicted. In various embodiments, method 800 may be performed using disaggregated integrated SONET and OTN switching system 300 in an optical network and a synchronous transport signal fabric. It is noted that certain operations described in method 800 may be optional or may be rearranged in different embodiments.

Method 800 may begin at step 802 by receiving, at a second SONET PIU module of an integrated SONET and OTN switching system, one or more component SONET circuits from a STS switch fabric via a second STS path of the STS switch fabric. At step 804, multiplexing, by a STS framer of the second SONET PIU module, the one or more component SONET circuits into a STS frame. At step 806, mapping, by an ODU STS mapper of the second SONET PIU module, the STS frame into an OPU frame. At step 808, mapping, by an ODU shim of the second SONET PIU module, the OPU frame into a corresponding ODU frame. At step 810, segmenting, by an ODU cellizer of the second SONET PIU module, the ODU frame into corresponding cells. At step 812, converting, by the second SONET PIU module, the corresponding cells to a second Ethernet packet. At step 814, transmitting the second Ethernet packet from the second SONET PIU module to the Ethernet fabric. At step 816, receiving at a second PIU module of the integrated SONET and OTN switching system, the second Ethernet packet via the Ethernet fabric from the second SONET PIU module. At step 818, converting the second Ethernet packet to a second ODU. At step 820, transmitting the second ODU from second PIU module to an OTN via the second ODU path.

As disclosed herein, methods and systems for a disaggregated integrated synchronous optical network (SONET) and optical transport network (OTN) switching system that includes using plug-in universal (PIU) modules for OTN to Ethernet transceiving, SONET PIU modules for Ethernet to SONET transceiving, and an Ethernet fabric as a switching core are disclosed. An OTN over Ethernet module in each of the PIU modules and an Ethernet over SONET module in each of the SONET PIU modules may enable various SONET and OTN functionality to be realized using the Ethernet fabric which may include multiple Ethernet switches.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A synchronous optical network (SONET) and optical transport network (OTN) switching system comprising:
   an Ethernet fabric;
   a first plug-in universal (PIU) module connected to a first optical data unit (ODU) path of an optical transport network (OTN) and connected to the Ethernet fabric to:
      receive a first ODU from the OTN via the first ODU path;
      convert the first ODU to a first Ethernet packet; and
      transmit the first Ethernet packet to the Ethernet fabric; and
   a first SONET PIU module connected to the Ethernet fabric and connected to a first synchronous transport signal (STS) path of a STS switch fabric to:
      receive the first Ethernet packet via the Ethernet fabric from the first PIU module from the first ODU path;
      convert the first Ethernet packet to a first SONET circuit;
      perform a pointer adjustment process on the first SONET circuit to align the first SONET circuit with a STS clock domain of the STS switch fabric; and
      transmit the first SONET circuit to the STS switch fabric via the first STS path.

2. The SONET and OTN switching system of claim 1, further comprising:
   a second SONET PIU module connected to the Ethernet fabric and connected to a second STS path of the STS switch fabric to:
      receive a second SONET circuit from the STS switch fabric via the second STS path;
      convert the second SONET circuit to a second Ethernet packet; and transmit the second Ethernet packet to the Ethernet fabric; and a second PIU module connected to a second ODU path of the OTN and connected to the Ethernet fabric to:
receive the second Ethernet packet via the Ethernet fabric from the second SONET PIU module;
convert the second Ethernet packet to a second ODU; and
transmit the second ODU to the OTN via the second ODU path.

3. The SONET and OTN switching system of claim 2, the second SONET PIU module further comprises:
an OTN over Ethernet (OTNoE) module to perform a byte justification process on the second Ethernet packet to align the second Ethernet packet with an OTN clock domain of the Ethernet fabric.

4. The SONET and OTN switching system of claim 2, the second SONET PIU module further comprises:
a STS framer to multiplex the second SONET circuit into a second STS frame;
an ODU STS mapper to map the second STS frame into a second OPU frame;
an ODU shim to map the second OPU frame into a second ODU frame;
an ODU cellizer to segment the ODU frame into corresponding second formatted cells; and
an OTNoE module to convert the second formatted cells to the second Ethernet packet.

5. The SONET and OTN switching system of claim 1, the first SONET PIU module further comprises:
an OTNoE module to format the first Ethernet packet into first formatted cells;
an ODU re-assembler to convert the first formatted cells to an ODU frame;
an ODU shim to convert the ODU frame to a corresponding optical payload unit (OPU) frame;
an ODU STS de-mapper to de-map the OPU frame into a STS frame; and
an STS de-framer to convert the STS frame to the first SONET circuit.

6. The SONET and OTN switching system of claim 1, wherein a SONET PIU module uses a SONET transport protocol for transmission of a SONET circuit over the STS switch fabric, and wherein the SONET circuit has a SONET frame format of at least one of a synchronous transport signal 1(STS-1) frame format, a STS-3 frame format, a STS-3c frame format, a STS-12 frame format, a STS-12c frame format, a STS-24 frame format, a STS-48 frame format, a STS-48c frame format, a STS-192 frame format, a STS-192c frame format, and a STS-768 frame format.

7. The SONET and OTN switching system of claim 1, wherein a SONET PIU module uses a synchronous digital hierarchy (SDH) transport protocol for transmission of a SONET circuit over the STS switch fabric, and wherein the SONET circuit has a SDH of at least one of a synchronous transport module level 0(STM-0) frame format, a STM-1 frame format, a STM-4 frame format, a STM-16 frame format, a STM-64 frame format, and a STM-256 frame format.

8. The SONET and OTN switching system of claim 1, wherein an ODU is at least one of an optical data unit 0 (ODU0), an ODU1, an ODU2, an ODU3, an ODU3, and an optical data unit flexible (ODUflex), and wherein the STS has a transmission data rate of up to at least one of a optical carrier (OC) transmission rate OC-3, OC-12, OC-48, and OC-192.

9. The SONET and OTN switching system of claim 1, wherein the Ethernet fabric further includes a number N of Ethernet switches to provide 1:N Ethernet switch fabric protection, and wherein a SONET PIU module further includes a protection STS path to provide 1+1 STS switch fabric redundancy of the STS switch fabric.

10. A method comprising:
receiving at a first plug-in universal (PIU) module of a synchronous optical network (SONET) and optical transport network (OTN) switching system a first optical data unit (ODU) from an OTN via a first ODU path of the OTN;
converting the first ODU to a first Ethernet packet;
transmitting the first Ethernet packet from the first PIU module to an Ethernet fabric of the SONET and OTN switching system;
receiving at a first SONET PIU module of the SONET and OTN switching system the first Ethernet packet via the Ethernet fabric from the first PIU module from the first ODU path;
converting the first Ethernet packet to a first SONET circuit;
performing a pointer adjustment process on the first SONET circuit to align the first SONET circuit with a STS clock domain of the STS switch fabric; and
transmitting the first SONET circuit from the first SONET PIU module to a synchronous transport signal (STS) switch fabric via a first STS path of the STS switch fabric.

11. The method of claim 10, further comprising:
receiving at a second SONET PIU module of the SONET and OTN switching system a second SONET circuit from the STS switch fabric via a second STS path of the STS switch fabric;
converting the second SONET circuit to a second Ethernet packet; and
transmitting the second Ethernet packet from the second SONET PIU module to the Ethernet fabric; and
receiving at a second PIU module of the SONET and OTN switching system the second Ethernet packet via the Ethernet fabric from the second SONET PIU module;
converting the second Ethernet packet to a second ODU; and
transmitting the second ODU from the second PIU module to the OTN via the second ODU path.

12. The method of claim 11, wherein converting the second SONET circuit to the second Ethernet packet further comprises:
performing a byte justification process on the second Ethernet packet to align the second Ethernet packet with an OTN clock domain of the Ethernet fabric.

13. The method of claim 11, wherein converting the second STS frame to the second Ethernet packet further comprises:
multiplexing the second SONET circuit into a second STS frame;
mapping the second STS frame into a second OPU frame;
mapping the second OPU frame into a second ODU frame;
segmenting the ODU frame into corresponding second formatted cells; and
converting the second formatted cells to the second Ethernet packet.

14. The method of claim 10, wherein converting the first Ethernet packet to the first SONET circuit further comprises:
formatting the first Ethernet packet into first formatted cells;
converting the first formatted cells to an ODU frame;

converting the ODU frame to a corresponding optical payload unit (OPU) frame;

de-mapping the OPU frame into a STS frame; and converting the STS frame to the first SONET circuit.

15. The method of claim 10, wherein a SONET PIU module uses a SONET transport protocol for transmission of a SONET circuit over the STS switch fabric, and wherein the SONET circuit has a SONET frame format of at least one of a synchronous transport signal 1(STS-1) frame format, a STS-3 frame format, a STS-3c frame format, a STS-12 frame format, a STS-12c frame format, a STS-24 frame format, a STS-48 frame format, a STS-48c frame format, a STS-192 frame format, a STS-192c frame format, and a STS-768 frame format.

16. The method of claim 10, wherein a SONET PIU module uses a synchronous digital hierarchy (SDH) transport protocol for transmission of a SONET circuit over the STS switch fabric, and wherein the SONET circuit has a SDH frame format of at least one of a synchronous transport module level 0(STM-0) frame format, a STM-1 frame format, a STM-4 frame format, a STM-16 frame format, a STM-64 frame format, and a STM-256 frame format.

17. The method of claim 10, wherein an ODU is at least one of an optical data unit 0 (ODU0), an ODU1, an ODU2, an ODU3, an ODU3, and an optical data unit flexible (ODUflex), and wherein the STS has a transmission data rate of up to at least one of a optical carrier (OC) transmission rate OC-3, OC-12, OC-48, and OC-192.

18. The method of claim 10, wherein the Ethernet fabric further includes a number N of Ethernet switches to provide 1:N Ethernet switch fabric protection, and wherein a SONET PIU module further includes a protection STS path to provide 1+1 STS switch fabric redundancy of the STS switch fabric.

* * * * *